US012761728B2

(12) United States Patent
Shi et al.

(10) Patent No.: US 12,761,728 B2
(45) Date of Patent: Oct. 13, 2026

(54) IMAGE PROCESSING METHOD AND APPARATUS

(71) Applicant: BOE TECHNOLOGY GROUP CO., LTD., Beijing (CN)

(72) Inventors: Juanjuan Shi, Beijing (CN); Lili Chen, Beijing (CN); Hao Zhang, Beijing (CN); Peng Han, Beijing (CN); Huidong He, Beijing (CN); Weihua Du, Beijing (CN); Qianwen Jiang, Beijing (CN); Ruifeng Qin, Beijing (CN); Jing Yu, Beijing (CN)

(73) Assignee: BOE Technology Group Co., Ltd., Chaoyang District (CN)

( * ) Notice: Subject to any disclaimer, the term of this patent is extended or adjusted under 35 U.S.C. 154(b) by 0 days.

(21) Appl. No.: 18/689,562

(22) PCT Filed: Aug. 26, 2022

(86) PCT No.: PCT/CN2022/115288

§ 371 (c)(1),
(2) Date: Mar. 6, 2024

(87) PCT Pub. No.: WO2024/040613

PCT Pub. Date: Feb. 29, 2024

(65) Prior Publication Data

US 2024/0393874 A1 Nov. 28, 2024

(51) Int. Cl.
*G06F 3/01* (2006.01)
*G06F 3/14* (2006.01)
(Continued)

(52) U.S. Cl.
CPC ................ *G06F 3/013* (2013.01); *G06F 3/01* (2013.01); *G06F 3/012* (2013.01); *G06F 3/14* (2013.01);
(Continued)

(58) Field of Classification Search
CPC . G06F 3/01; G06F 3/012; G06F 3/013; G06F 3/14; G06F 3/147; G06T 3/40;
(Continued)

(56) References Cited

U.S. PATENT DOCUMENTS 9,897,805 B2 * 2/2018 Stafford ................ A63F 13/212
9,912,930 B2 * 3/2018 Zustak ............... H04N 21/4728
(Continued)

FOREIGN PATENT DOCUMENTS

CN 105094272 A 11/2015
CN 106157925 A 11/2016
(Continued)

OTHER PUBLICATIONS

Partial Supplementary European Search Report re EP 22956158.4, dated Jul. 2, 2025, 25 pages.

*Primary Examiner* — Jason M Mandeville
(74) *Attorney, Agent, or Firm* — The Webb Law Firm

(57) ABSTRACT

An image processing method is applied to an electronic device with a display screen. The method includes obtaining a plurality of frame rates in at least one first time period, the electronic device being configured with a first preset frame rate in the first time period; determining a second preset frame rate of the electronic device in a second time period after the first time period based on the plurality of frame rates in the at least one first time period; and rendering an image in the second time period based on the second preset frame rate to display the rendered image through the display screen.

10 Claims, 11 Drawing Sheets

(51) Int. Cl.

| | |
|---|---|
| ***G06F 3/147*** | (2006.01) |
| ***G06T 3/40*** | (2006.01) |
| ***G09G 3/20*** | (2006.01) |
| ***G09G 5/00*** | (2006.01) |

(52) U.S. Cl.

CPC ................ *G06F 3/147* (2013.01); *G06T 3/40* (2013.01); *G09G 3/2092* (2013.01); *G09G 5/00* (2013.01); *G06T 2200/28* (2013.01); *G09G 2340/0407* (2013.01); *G09G 2340/0435* (2013.01); *G09G 2354/00* (2013.01)

(58) Field of Classification Search

CPC .............. G06T 2200/28; G09G 3/2092; G09G 2340/0407; G09G 2340/0435; G09G 2354/00; G09G 5/00

USPC .......................................................... 345/156

See application file for complete search history.

(56) References Cited

U.S. PATENT DOCUMENTS

| | | | |
|---|---|---|---|
| 11,188,146 B2 | 11/2021 | Löffler et al. | |
| 2002/0001397 A1 | 1/2002 | Ishikawa et al. | |
| 2014/0002730 A1 | 1/2014 | Thomson et al. | |
| 2014/0253694 A1* | 9/2014 | Zustak | H04N 13/383 348/576 |
| 2016/0131912 A1 | 5/2016 | Border et al. | |
| 2016/0189423 A1* | 6/2016 | Kaeser | G06F 3/04815 345/420 |
| 2018/0196512 A1* | 7/2018 | Kim | G06F 1/1637 |
| 2019/0005884 A1 | 1/2019 | Yoo | |
| 2019/0273910 A1* | 9/2019 | Malaika | G09G 3/003 |
| 2019/0384381 A1* | 12/2019 | Stafford | G02B 27/0179 |
| 2020/0273436 A1 | 8/2020 | Kempf et al. | |
| 2022/0189418 A1 | 6/2022 | Banik et al. | |
| 2024/0196065 A1* | 6/2024 | Hamada | G06V 10/761 |

FOREIGN PATENT DOCUMENTS

| | | |
|---|---|---|
| CN | 106919401 A | 7/2017 |
| CN | 108811055 A | 11/2018 |
| CN | 109157839 A | 1/2019 |
| CN | 110366035 A | 10/2019 |
| CN | 209527982 U | 10/2019 |
| CN | 111103979 A | 5/2020 |
| CN | 106537219 B | 3/2021 |
| CN | 114115773 A | 3/2022 |
| CN | 114374832 A | 4/2022 |

* cited by examiner

IMAGE PROCESSING METHOD AND APPARATUS

CROSS-REFERENCE TO RELATED APPLICATION

This application is the United States national phase of International Patent Application No. PCT/CN2022/115288, filed Aug. 26, 2022, the disclosure of which is hereby incorporated by reference in its entirety.

BACKGROUND OF THE INVENTION

Field of the Invention

The present disclosure relates to the field of image processing technologies, and in particular, to an image processing method and an image processing apparatus.

DESCRIPTION OF RELATED

With the development of image processing technology, users are increasingly demanding the display effect of a display of electronic device. In order to meet the needs of users, manufacturers have begun to pursue high requirements for display effects, for example, to support high refresh rate and high resolution to achieve a more coherent and smooth dynamic display.

With the continuous increase of refresh rate and resolution, the performance requirements of processors for electronic devices are also increasing. However, the performance of the processor of electronic device has an upper limit. While meeting the user's demand for high-resolution images, if a high refresh rate is used to refresh the image, problems such as frame loss and image lag may occur.

SUMMARY OF THE INVENTION

In an aspect, an image processing method is provided, and the image processing method is applied to an electronic device with a display screen. The method includes: obtaining a plurality of frame rates in at least one first time period, the electronic device being configured with a first preset frame rate in the first time period, the electronic device being configured with a first preset frame rate in the first time period; determining a second preset frame rate of the electronic device in a second time period next to the first time period based on the plurality of frame rates in the at least one first time period; and rendering an image in the second time period based on the second preset frame rate to display the rendered image through the display screen. A frame rate used by the electronic device when rendering the image in the second time period is less than or equal to the second preset frame rate.

In some embodiments, the electronic device is configured with a plurality of preset frame rates, and the "determining a second preset frame rate of the electronic device in a second time period next to the first time period based on the plurality of frame rates in the at least one first time period" includes: determining the second preset frame rate of the electronic device in the second time period based on an average value of frame rates in each of the at least one first time period, the plurality of preset frame rates including the first preset frame rate and the second preset frame rate.

In some embodiments, in a case where a difference between the average value of the frame rates in each first time period of the at least one first time period and the first preset frame rate is less than a preset value, the second preset frame rate is a preset frame rate that is greater than the first preset frame rate among the plurality of preset frame rates.

In some embodiments, in a case where a difference between the average value of the frame rates in the first time period and the first preset frame rate is greater than or equal to a preset value, the second preset frame rate is a preset frame rate that is less than or equal to the average value of the frame rates in the first time period among the plurality of preset frame rates.

In some embodiments, the method further includes: setting, in response to an initial power-on operation, an initial preset frame rate of the electronic device to a maximum preset frame rate among the plurality of preset frame rates.

In some embodiments, the method further includes: obtaining a head rotation speed of a user who uses the electronic device in the at least one first time period; and determining a first resolution corresponding to the electronic device in the second time period and adjusting the second preset frame rate based on the head rotation speed of the user, the first preset resolution being inversely proportional to the head rotation speed of the user. The above "rendering an image in the second time period based on the second preset frame rate" includes: rendering the image in the second time period based on the adjusted second preset frame rate and the first resolution.

In some embodiments, the electronic device is configured with a plurality of preset resolutions. The "determining a first resolution corresponding to the electronic device in the second time period based on the head rotation speed of the user" includes: determining that, in a case where the head rotation speed of the user is greater than a preset speed, the first resolution corresponding to the electronic device in the second time period is a first preset resolution among the plurality of preset resolutions; and determining that, in a case where the head rotation speed of the user is less than or equal to the preset speed, the first resolution corresponding to the electronic device in the second time period is a second preset resolution among the plurality of preset resolutions. The second preset resolution is greater than the first preset resolution.

In some embodiments, in a case where the head rotation speed of the user is greater than the preset speed, the second preset frame rate is adjusted to a third preset frame rate, the third preset frame rate being a preset frame rate that is greater than the second preset frame rate among the plurality of preset frame rates; in a case where the head rotation speed of the user is less than or equal to the preset speed, the second preset frame rate is adjusted to a fourth preset frame rate, the fourth preset frame rate being a preset frame rate that is less than the second preset frame rate among the plurality of preset frame rates. A ratio of the second preset resolution to the first preset resolution is less than or equal to a ratio of the third preset frame rate to the fourth preset frame rate.

In another aspect, an image processing method is provided, and the image processing method is applied to an electronic device with a display screen. The method includes: determining a gazing region corresponding to a user gazing at the display screen at a current time; obtaining an image to be processed; determining data information of an image of the gazing region in the image to be processed; determining image processing complexity of the image of the gazing region based on the data information of the image of the gazing region; obtaining an image rendering capability of a graphics processor (GPU) of the electronic device; determining a first resolution and a first refresh rate corresponding to the image of the gazing region based on the image processing complexity of the image of the gazing region and the image rendering capability of the GPU; and rendering the image of the gazing region based on the first resolution and the first refresh rate to obtain a rendered image to be processed to display the rendered image to be processed through the display screen.

In some embodiments, the method further includes: determining image processing complexity of the image to be processed; and determining a target resolution and a target refresh rate of the image to be processed based on the image processing complexity of the image to be processed and the image rendering capability of the GPU. The "determining a first resolution and a first refresh rate corresponding to the image of the gazing region based on the image processing complexity of the image of the gazing region and the image rendering capability of the GPU" includes: determining the first resolution based on the target resolution and the image processing complexity of the image of the gazing region; and using the target refresh rate as the first refresh rate.

In some embodiments, the "determining a gazing region corresponding to a user gazing at the display screen" includes: obtaining pupil coordinates of the user at the current time; and determining the gazing region corresponding to the user at the current time based on the pupil coordinates.

In some embodiments, the electronic device is provided with a sensor for detecting a head rotation speed of the user, and the method further includes: obtaining the head rotation speed of the user at the current time through the sensor. The above-mentioned "determining a first resolution and a first refresh rate corresponding to the image of the gazing region based on the image processing complexity of the image of the gazing region and the image rendering capability of the GPU" includes: determining the first resolution and the first refresh rate based on the image processing complexity of the image of the gazing region, the image rendering capability of the GPU and the head rotation speed of the user.

In some embodiments, the "determining image processing complexity of the image of the gazing region based on the data information of the image of the gazing region" includes: determining the image processing complexity of the image of the gazing region based on the data information of the image of the gazing region and a preset complexity database. The preset complexity database includes a corresponding relationship between the data information and the image processing complexity of the image, and the data information of the image of the gazing region includes one or more of a number of sub-images and a number of layers of the image of the gazing region.

In some embodiments, product of the target resolution and the target refresh rate is a preset parameter value, and the preset parameter value is related to configuration information of the electronic device.

In some embodiments, the method further includes: determining a second resolution and a second refresh rate corresponding to an image of a non-gazing region, the non-gazing region being a region in a display region of the display screen except for the gazing region, the second resolution being less than the first resolution, and the second refresh rate being equal to the first refresh rate; and rendering the image of the non-gazing region by using the second resolution and the second refresh rate to obtain a rendered image of the non-gazing region.

In some embodiments, the second resolution is a difference between the target resolution and the first resolution.

In some embodiments, the method further includes: stitching the rendered image of the gazing region and the rendered image of the non-gazing region to obtain a rendered image to be processed.

In some embodiments, the electronic device is provided with a first application programming interface (API) and a second API, the first API is connected to the sensor, and the second API is connected to the GPU; the method includes: obtaining the head rotation rate of the user through the first API; and obtaining the image processing complexity of the image to be processed through the second API.

In yet another aspect, an image processing apparatus is provided. The image processing apparatus includes a processor and a communication interface. The communication interface is coupled to the processor, and the processor is used to run computer programs or instructions to implement the image processing method in the first aspect or the image processing method in any embodiment of the first aspect.

In yet another aspect, an image processing apparatus is provided. The image processing apparatus includes a processor and a communication interface. The communication interface is coupled to the processor, and the processor is used to run computer programs or instructions to implement the image processing method in the second aspect or the image processing method in any embodiment of the second aspect.

In still another aspect, a computer-readable storage medium is provided. The computer-readable storage medium has stored thereon computer program instructions that, when run on a computer (e.g., an electric device), cause the computer to execute the image processing method in the first aspect or the image processing method in any embodiment of the first aspect.

In still another aspect, a computer-readable storage medium is provided. The computer-readable storage medium has stored thereon computer program instructions that, when run on a computer (e.g., an electric device), cause the computer to execute the image processing method in the second aspect or the image processing method in any embodiment of the second aspect.

In still another aspect, a computer program product is provided. The computer program product includes computer program instructions, and when executed on a computer (e.g., an electronic device), the computer program instructions cause the computer to perform the image processing method in the first aspect or the image processing method in any embodiment of the first aspect.

In still another aspect, a computer program product is provided. The computer program product includes computer program instructions, and when executed on a computer (e.g., an electronic device), the computer program instructions cause the computer to perform the image processing method in the second aspect or the image processing method in any embodiment of the second aspect.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DESCRIPTION OF THE INVENTION

Figure 1:
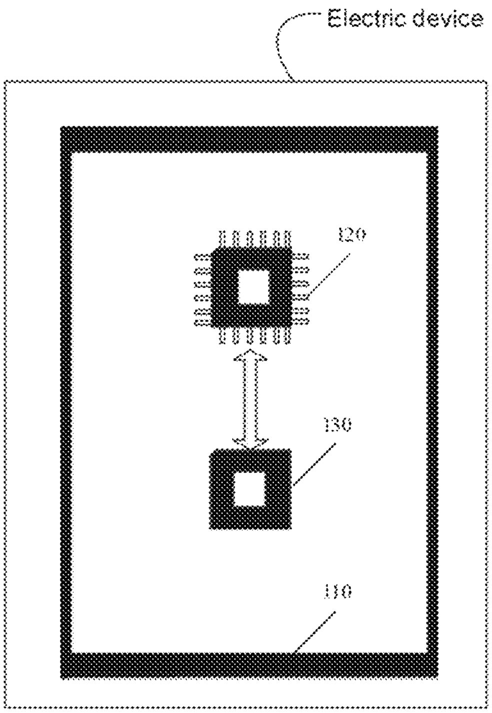
FIG. 1 is a structural diagram of an electronic device, in accordance with some embodiments.

The technical solutions in some embodiments of the present disclosure will be described clearly and completely with reference to the accompanying drawings; obviously, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, throughout the description and claims, the term “comprise” and other forms thereof such as the third-person singular form “comprises” and the present participle form “comprising” are construed as an open and inclusive meaning, i.e., “included, but not limited to”. In the description of the specification, terms such as “one embodiment”, “some embodiments”, “exemplary embodiments”, “example”, “specific example” or “some examples” are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as “first” and “second” are used for descriptive purposes only, but are not to be construed as indicating or implying the relative importance or implicitly indicating the number of indicated technical features. Thus, a feature defined by “first” or “second” may explicitly or implicitly include one or more of the features. In the description of the embodiments of the present disclosure, the term “a plurality of” or “the plurality of” means two or more unless otherwise specified.

Some embodiments may be described using the terms “coupled” and “connected” and their derivatives. For example, the term “connected” may be used in the description of some embodiments to indicate that two or more components are in direct physical or electrical contact with each other. For another example, the term “coupled” may be used in the description of some embodiments to indicate that two or more components are in direct physical or electrical contact. However, the term “coupled” or “communicatively coupled” may also mean that two or more components are not in direct contact with each other, but still cooperate or interact with each other. The embodiments disclosed herein are not necessarily limited to the context herein.

The phrase “at least one of A, B, and C” has a same meaning as the phrase “at least one of A, B, or C”, and both include the following combinations of A, B, and C: only A, only B, only C, a combination of A and B, a combination of A and C, a combination of B and C, and a combination of A, B, and C.

The phrase “A and/or B” includes following three combinations: only A, only B, and a combination of A and B.

As used herein, the term “if” is, optionally, construed to mean “when” or “upon” or “in response to determining” or “in response to detecting”, depending on the context. Similarly, depending on the context, the phrase “if it is determined” or “if [a stated condition or event] is detected” is optionally construed as “in a case where it is determined”, “in response to determining”, “in a case where [the stated condition or event] is detected”, or “in response to detecting [the stated condition or event]”.

The use of the phase “applicable to” or “configured to” herein means an open and inclusive language, which does not exclude devices that are applicable to or configured to perform additional tasks or steps.

Additionally, the use of the phase “based on” is meant to be open and inclusive, since a process, step, calculation or other action that is “based on” one or more of the stated conditions or values may, in practice, be based on additional conditions or value beyond those stated.

In the following, terms involved in the embodiments of the present application are explained to facilitate readers' understanding.

Virtual reality (VR), which is a computer simulation system that capable of creating and experiencing a virtual world. VR may use a computer to generate a simulated environment. VR is a system simulation of multi-source information fusion, interactive three-dimensional dynamic vision and entity behaviors. Based on VR, users may be immersed in the simulated environment. VR technology is an important direction of simulation technology, and is a collection of simulation technology, computer graphics human-computer interface technology, multimedia technology, sensing technology, network technology and other technologies. VR technology mainly includes simulated environment, perception, natural skill and sensing device. The simulated environment is a computer-generated, real-time dynamic three-dimensional realistic image. Perception means that VR should have the perception that all people have under ideal conditions. In addition to the visual perception generated by the computer graphic technology, it may also include hearing, touch, force, movement and other perceptions, as well as smell and taste, which are referred to as multi perception.

Refresh rate, which may be referred to as frame rate. The refresh rate refers to how many times per second the image displayed by the display device is redrawn, i.e., the number of times the electronic device is refreshed per second, measured in Hertz (Hz). The higher the refresh rate, the more stable the image, the more natural and clear the image display, and the less impact on the user's eyes. The lower the refresh rate, the more severe the image flickers and shakes, and the faster the user's eye get tired. Generally speaking, if the refresh rate of 80 Hz or above may be achieved, image flicker and jitter may be completely eliminated, and the user's eyes will not be tired easily.

From a hardware perspective, the most important factor affecting the refresh rate of electronic devices is bandwidth of the display. Bandwidth is a comprehensive indicator of the display and an important indicator of the quality of the display. Bandwidth refers to the number of images scanned per second, i.e., the total number of frequency points displayed on each scan line per unit time. The unit of bandwidth is Hertz (Hz). The higher the refresh rate of the display, the higher the bandwidth of the display.

From a software perspective, the biggest impact on the refresh rate is the resolution of the display. The higher the resolution of the display, the lower the refresh rate will be without changing the bandwidth. Therefore, to maintain a high refresh rate of the display, the only way is to use high bandwidth.

Number of frames, which may be referred to as the frame rate, and refers to the speed at which the image of the display changes. For example, if the number of frames of the electronic device is 60 frames per second (fps), which means that the graphics card generates 60 images per second (theoretically, each frame is a different image). The number of frames is determined by the graphics card. The higher the performance of the graphics card, the higher the number of frames. The higher the number of frames, the smoother the images of the electronic device. For example, the number of frames is ½ of the refresh rate, which means that the graphics card outputs the same image to the display every two times. On the contrary, if the number of frames is 2 times the refresh rate, then for every two changes in the images, only one of which is sent by the graphics card and displayed on the display. This means that the number of frames higher than the refresh rate is an invalid number of frames, which does not improve the image effect, but may lead to abnormal images. The graphics card is responsible for rendering images, and the faster the rendering speed, the higher the number of frames, and the more images are transferred to the screen. The screen is responsible for quickly displaying the image received from the graphics card, and the faster it is displayed, the higher the refresh rate. Smooth VR experience can only be achieved in a case where the refresh rate and frames match.

In an example, in a case where the frame rate of the electronic device is higher than the refresh rate, the graphics card renders 100 images per second (100 frames per second), but the display may only display 60 images per second (the refresh rate is 60 Hz), then the display may only display 60 images, and the remaining 40 images cannot be displayed, which is equivalent to the graphics card doing useless work, i.e., usually referred to as the phenomenon of frame loss. In addition, in a case where the graphics card outputs frames faster than the refresh rate of the display, the display will not be able to process the output frames in time, so that the display displays images of different frames, which is usually referred to as the phenomenon of tearing.

In another example, in a case where the number of frames is lower than the refresh rate, the display will display the images that the graphics card has rendered multiple times, which is usually referred to as the phenomenon of jitter. For the VR technology, the refresh rate directly affects the smoothness of VR applications. Therefore, the VR application itself needs to maintain a high system frame rate to provide the best rendering quality.

Resolution, which may be referred to as resolution and resolution. Resolution refers to the number of pixels displayed by the display screen in horizontal and vertical directions, such as 1024×768, or 1280×1024. In 1024×768, "1024" refers to the number of pixels in the horizontal direction of the screen, and "768" refers to the number of pixels in the vertical direction of the screen. Resolution determines how fine the image is. The higher the resolution of an image, the more pixels it includes and the clearer the image.

In generally, in order to meet the needs of users for high-definition content, electronic devices (e.g., mobile terminals, VR headsets, or TVs) may render images by using the high refresh rate and high resolution to obtain high-definition images and display the high-definition images on the screen. For example, considering an example in which the electronic device is a VR head-mounted device, in the initial stage of using the VR headset by the user, user discomfort may be introduced due to the low resolution and refresh rate of the display of the VR headset. Therefore, in order to improve the user experience, VR headsets may render images by using the high resolution and high refresh rate.

However, the hardware parameter value (e.g., a dot_clk value) of electronic devices is fixed. The hardware parameter value may have the following relationship with the refresh rate and resolution of the electronic device: $v\_total*h\_total*fps \leq dot\_clk$. $v\_total*h\_total$ represents the resolution of the electronic device; fps represents the refresh rate. It can be seen from this relationship that electronic devices cannot infinitely increase the refresh rate or resolution.

In light of this, some embodiments of the present disclosure provide an image processing method, which is applied to electronic devices. In the embodiments of the present disclosure, the electronic device may be configured with a plurality of preset frame rates. The electronic device may select a preset frame rate for the next time period from the plurality of preset frame rates based on multiple frame rates within at least one time period. In this way, based on multiple frame rates of at least one historical time period, the electronic device may dynamically adjust the preset frame rate of the next time period. Reference may be made to the solution of Embodiment 1 below. Furthermore, in order to ensure that the displayed images are high-definition images, the display solutions of electronic devices generally use a fixed refresh rate and high resolution method to turn on the screen. Individual electronic devices may achieve variable refresh rates by setting several fixed gears (usually three gears). However, the refresh rate of the image in a single scene in an electronic device provided with a fixed gear is not variable. Once the complexity of the image scene becomes high, the refresh rate of the electronic device may not be flexibly adjusted, which may lead to the problem of lag and unsmooth of the images. Moreover, for images with low scene complexity, blindly pursuing high refresh rates may also lead to the problem of increased power consumption.

It will be noted that in the embodiments of the present disclosure, the complexity of the scene of the image may refer to the number of objects and the number of layers included in the image. The higher the complexity of the scene of the image, the more resources it takes to render the image, and the greater the rendering time. Furthermore, the power consumption of electronic devices for rendering images will also increase.

In an example, in the application scenario of personal computer (PC)+virtual reality (VR) device, there are two solutions to implement variable refresh rate: first, manually switching the refresh of the display of the VR device; second, configuring a special graphics card and display for the VR device to achieve seamless frame rate switching of the display.

However, in a case of manually switching the refresh rate of the display of the VR device, screen flickering may occur due to the need for the PC to shake hands with the display; in a case of configuring the VR device with a special graphics card and display, the cost is increased.

In addition, high resolution is not only an important function of electronic device display, but, due to the limitations of the processor performance of the electronic device, the electronic device is unable to display images with high resolution while using high refresh rates.

In view of this, embodiments of the present disclosure provide a solution for adaptive refresh rate switching, which may be applied to electronic devices. In the embodiments of the present disclosure, the electronic device may divide the display region of the display screen into a high-definition region and a low-definition region based on the gaze of the user, and render images in the high-definition region and images in the low-definition region by using different resolutions to achieve the adaptive switching of resolution. Moreover, in the embodiments of the present disclosure, the electronic device may determine the complexity of image processing in the current scene based on the current performance of the processor of the electronic device and the rotation speed of user's head, so that the refresh rate may be flexibly adjusted to improve the smoothness of the image and reduce the power consumption of electronic device. Reference may be made to the solution of Embodiment 2 below.

It will be noted that in the embodiments of the present disclosure, the electronic device may be a television, a computer, a VR device, or other devices with a display screen. The VR device may be a head-mounted device. The display screen of the electronic device may support refresh in different regions, and the refresh rate of each region may be different. For example, the display region of the display screen of the electronic device may be divided into multiple sub-regions, and each sub-region may be displayed at a different refresh rate.

In a possible design, the electronic device may have multiple control components, and each control component corresponds to a sub-region. There is a driving line between each control component and each display pixel point of the corresponding sub-region in the display region. In this way, each control component may control the output of the corresponding sub-region. That is, each control component may control the refresh rate and resolution of the corresponding sub-region.

Embodiments of the present disclosure will be described in detail below with reference to the accompanying drawings.

As shown in FIG. 1, FIG. 1 is a schematic structural diagram of the electronic device provided in the embodiments of the present disclosure. The electronic device may have a display 110, a processor 120, and a graphics processing unit (GPU) 130. The display 110, the processor 120 and the GPU 130 may be communicatively connected. For example, the display 110 and the processor 120 may be connected through the system bus 130. The processor 120 may be communicatively connected to the GPU.

The display 110 may include a display screen/screen. The display 110 may be used to display images. For example, the display may be a liquid crystal display (LCD), an organic light-emitting diode (OLED) display or the like.

The processor 120 may include one or more central processing units (CPUs). The CPU may be used to parse images and perform operations (e.g., stitching images, determining the gazing region of the user) of the electronic device in the embodiments of the present disclosure. The GPU 130 may be used to determine data information of an image to be rendered and render the image.

Figure 2:
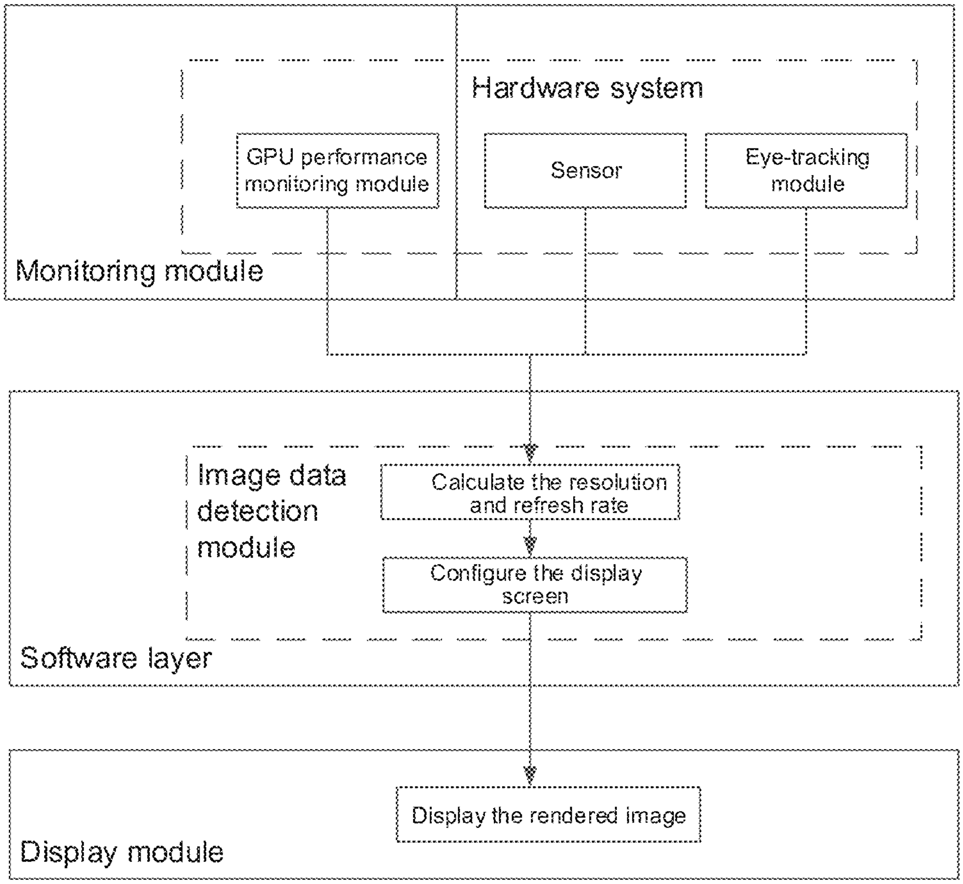
FIG. 2 is a structural diagram of an electronic device, in accordance with some embodiments.

In a possible implementation, as shown in FIG. 2, the electronic device may also be provided with a monitoring module, a software layer and a display module.

The monitoring module may be used to monitor the performance of the hardware system of the electronic device and the data of external devices of the electronic device. External devices of the electronic device may include a sensor and an image data detection module. The image data detection module may be used to detect data information of the image, such as the number of objects included in the image, or the number of layers in the image. The data information of the image may be used to determine the complexity of the image.

For example, the monitoring module may include a GPU performance monitoring module and a sensor and an eye-tracking module. The GPU performance monitoring module may be used to detect the rendering capability of the GPU. The rendering capability of the GPU may be used to characterize the amount of image data that the GPU can render. The sensor is used to obtain the head rotation speed of the user. The eye-tracking module may be used to detect coordinates of the user's pupil. The image data detection module may be used to detect the data information of the image.

The software layer may be used to calculate the complexity of the image based on the performance of the processor, the head rotation speed of the user and the coordinates of the user's pupil, and calculate the resolution and refresh rate corresponding to the image in the region based on the data information of the image in the region corresponding to the coordinates of the pupil. Thus, the electronic device may achieve the function of dynamically adjusting the resolution and refresh rate. For example, the software layer may include the image data detection module. The image data detection module may perform the functions of the software layer.

In an example, the software layer may be provided with an operating system, and the operating system may be used to run program code. The program code may implement the method provided by the embodiments of the present disclosure. For example, the operating system may be Android system, and may also be other systems, which is not limited. The operating system may achieve a unified scheduling interface for rendering images based on Choreographer mechanism and Vertical sync (V sync) mechanism. The Choreographer mechanism and V sync mechanism will not be described in detail.

Further, after the electronic device determines the frame rate, resolution and refresh rate used to render the image, the electronic device may output the determined frame rate, resolution and refresh rate to the operating system through the application programming interface (API). In this way, the operating system may modify the corresponding parameters in the program code based on the received frame rate, resolution and refresh rate, so as to achieve the method provided in the embodiments of the present disclosure.

The display module may be a display or a display module, and may be used to display the rendered image.

Figure 3:
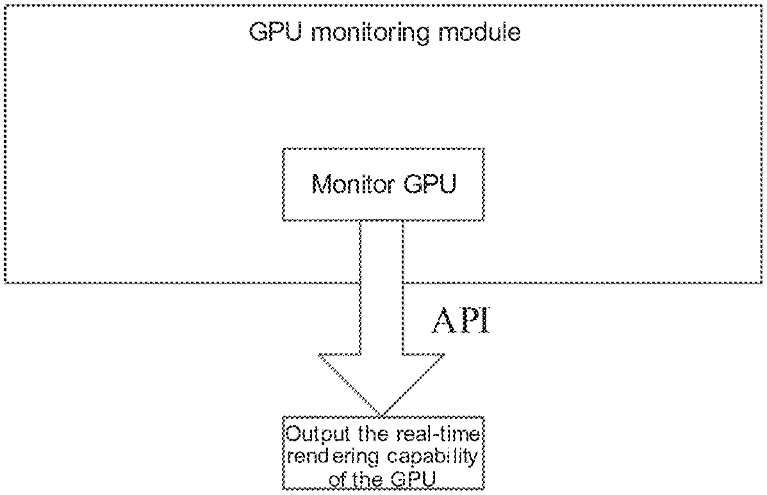
FIG. 3 is a structural diagram of an electronic device, in accordance with some embodiments.

In an example, as shown in FIG. 3, the GPU monitoring module may be configured with an API for communication. The API interface may be used to output the real-time rendering capability of the GPU. For example, the processor monitoring module may monitor the current rendering capability of the GPU and transmit the real-time rendering capability of the GPU to the processor through the API. The processor may calculate the resolution and refresh rate corresponding to the image to be processed based on the real-time rendering capability of the GPU and the complexity of the image to be processed. For details, reference is made to the subsequent description.

After the processor calculates the resolution and refresh rate of the image to be processed, it may transmit the resolution and refresh rate of the image to be processed to the GPU through the API. In this way, the GPU may render the image to be processed based on the resolution and refresh rate to obtain the rendered image to be processed.

The electronic device and developers may easily call processing data of the processor through the API, so that the performance of the GPU may be detected based on the processing data.

Figure 4:
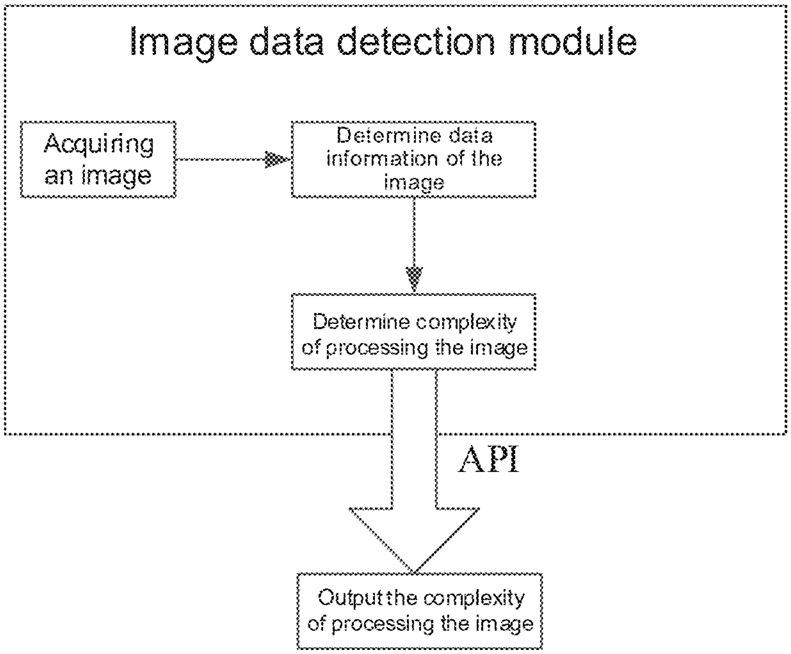
FIG. 4 is a structural diagram of an electronic device, in accordance with some embodiments.

In another example, as shown in FIG. 4, the image data detection module may also be provided with an API. The image data detection module may detect the data amount of the image to be processed after acquiring the data information of the image to be processed, and determine the complexity of the image to be processed based on the data amount of the image to be processed. Furthermore, the image data detection module may output the complexity of the image to be processed through the API. For the method for determining the complexity of the image to be processed, reference will be made to the description of the following embodiments.

In another possible implementation, the electronic device may also be equipped with an infrared camera. The infrared camera may be used to capture an eye image of the user. The electronic device may determine the gaze point of human eyes based on the eye image, and determine the gazing region of the user based on the gaze point of human eyes. The gazing region may also be referred to as the high definition region.

Furthermore, in order to more accurately determine the gaze point of human eyes, the electronic device may also be equipped with an infrared fill light. In this way, with the assistance of the infrared fill light, the electronic device may use infrared camera to clearly and accurately capture the eye image. The electronic device may recognize the eye image to obtain the gaze point of human eyes, and determine the coordinate information of the gaze point based on the gaze point of human eyes. For example, the electronic device may recognize the eye image based on the preset human eye positioning algorithm to obtain the coordinate information of the gaze point of human eyes. The human eye positioning algorithm will not be described in detail.

For example, with reference to FIG. 2, after determining the gaze coordinates of the gaze point of the user, the eye-tracking module may transmit the coordinate information of the gaze point of the user to the software layer. After receiving the coordinate information of the gaze point of the user, the software layer may use the coordinate information of the gaze point as the center to determine the region (i.e., the gazing region) corresponding to the display screen. A size of the gazing region is in a preset shape (e.g., a rectangle), and an area of the gazing region is a preset value.

It will be noted that after the electronic device determines the gazing region of the user, the region in the display region of the display screen other than the gazing region is defined as a non-gazing region.

In yet another possible implementation, in the embodiments of the present disclosure, the electronic device may also be communicatively connected to the server. The server may be used to provide image data/video data.

The image processing method provided by the embodiments of the present application (including Embodiment 1 and Embodiment 2) will be described with reference to the electronic device shown in FIG. 1.

Embodiment 1

Figure 5:
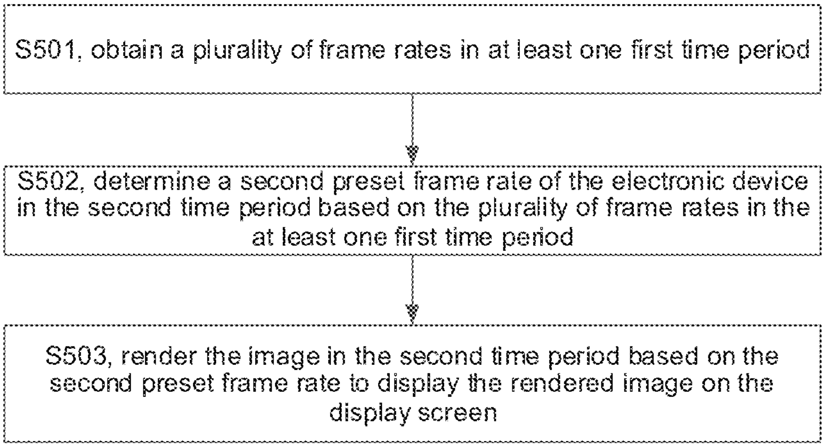
FIG. 5 is a flow diagram of an image processing method, in accordance with some embodiments.

As shown in FIG. 5, which is the image processing method provided by the embodiments of the present application, the method may be applied to the electronic device shown in FIG. 1. The method includes the following steps S501 to S503.

In S501, a plurality of frame rates in at least one first time period are obtained.

In the first time period, the electronic device is configured with a first preset frame rate. In the first time period, the frame rate, actual frame rate or application frame rate of the electronic device is less than or equal to a first preset frame rate. The plurality of frame rates in at least one time period may include multiple frame rates in one time period or multiple frame rates in each of a plurality of consecutive first time periods, such as 3 consecutive time periods. The length of the first time period may be set as needed, for example, may be 3 seconds (s), 5 s, or 6 s, which is not limited.

In an example, the electronic device may be configured with a plurality of preset frame rates, for example, may be configured with a plurality of preset frame rates (also referred to as frame rate gears), such as 120 fps, 115 fps, 110 fps, 105 fps, 100 fps, 95 fps, 90 fps, 85 fps, 80 fps, and 75 fps. Of course, the electronic device may also be configured with more preset refresh rate gears, for example, may be configured with 75 Hz, 70 Hz, and 65 Hz, which is not limited.

It will be noted that, in a case where the preset frame rate of the electronic device in a certain time period is one of the plurality of preset frame rates, the frame rate of the electronic device rendering images within the time period is less than or equal to the preset frame rate. For example, if the preset frame rate of the electronic device in a time period 1 is 115 fps, then in the time period 1, the frame rate of the electronic device rendering images is less than or equal to 115 fps. The refresh rate and resolution of the electronic device rendering images in this time period may be set based on the image rendering capability of the GPU of the electronic device and the image processing complexity of the image. For details, reference will be made to the following Embodiment 2.

In S502, a second preset frame rate of the electronic device in the second time period is determined based on the plurality of frame rates in the at least one first time period.

The second time period is a time period next to the at least one first time period. The plurality of preset frame rates may include a first preset frame rate and a second preset frame rate.

In a possible implementation, the electronic device may determine the second preset frame rate of the electronic device in the second time period based on an average of the plurality of frame rates in the at least one first time period.

In an example, in a case where a difference between the average value of the plurality of frame rates in the at least one first time period and the first preset frame rate is less than a preset value, the second preset frame rate is a preset frame rate that is greater than the first preset frame rate among the plurality of preset frame rates.

For example, with reference to the plurality of preset frame rates in S501, the first preset frame rate is 75 fps, the length of the first time period is 5 s, and the preset value is 5. The average values of the frame rates in 3 consecutive 5 s (i.e., 15 s) are 74 fps, 73 fps, and 73 fps respectively. The differences between these three average values and 75 are all less than 5, which means that the electronic equipment is relatively stable. Thus, it is possible to increase the preset frame rate of the electronic device. The second preset frame rate may be 80 fps, or other preset frame rates greater than 75 fps.

In another example, in a case where a difference between the average value of the frame rates in the first time period and the first preset frame rate is greater than or equal to a preset value, the second preset frame rate is a preset frame rate that is less than the average value of the frame rates in the first time period among the plurality of preset frame rates.

For example, with reference to the plurality of preset frame rates in S501, the first preset frame rate is 120 fps. The average value of frame rates in a certain 5 s is 78 fps, which means that the frame rate of the electronic device is unstable and needs to be adjusted. The electronic device may set the preset frame rate in the next 5 s after that 5 s to 75 fps.

In yet another example, in response to an initial power-on operation, the electronic device may set an initial preset frame rate to the maximum preset frame rate among the plurality of preset frame rates. For example, with reference to the plurality of preset frame rates in S501, when the electronic device is initially powered on, the electronic device may set the preset frame rate to 120 fps. In this way, it may be ensured that the electronic device may improve the utilization of the graphics card as much as possible when rendering the initial image, thereby avoiding the problem of low utilization of the graphics card due to a fact that the preset frame rate of the electronic device is set too low. For example, during the power-on period, the preset frame rate of the electronic device is 80 fps, but at this time the actual frame rate of the graphics card may reach 110 fps. Since the frame rate of the graphics card cannot exceed 80 fps, the utilization of the graphics card is low.

In an example, when the electronic device is initially powered on, the preset frame rate of the electronic device is 120 fps. The electronic device may obtain the average value of frame rates in 5 s of the power-on period. The difference between the average value of the frame rates in the 5 s and 120 fps is less than 5, which means that the current frame rate is relatively stable. The electronic device may simply obtain a plurality of frame rates in the next 5 s. In a case where the difference between the average value of the frame rates in each of 3 consecutive 5 s and 120 fps is less than 5, the electronic device may maintain the current preset frame rate. The difference between the average value of the frame rates in a certain 5 s and 120 fps is greater than or equal to 5, which means that the electronic device should adjust the preset frame rate. For example, if the average value of the frame rates of this 5 s is 78 fps, the electronic device may adjust the preset frame rate to 75 fps in the next 5 s of this 5 s.

For example, the electronic device may be provided with one or more buttons. The one or more buttons may be physical buttons or touch buttons. The one or more buttons may be used to determine the preset refresh rate of the electronic device. For example, the electronic device may, in response to a pressing operation of the one or more buttons, set the initial refresh rate to a preset refresh rate corresponding to the pressing operation.

In S503, the image is rendered in the second time period based on the second preset frame rate to display the rendered image on the display screen.

The frame rate used by the electronic device when rendering the image in the second time period is less than or equal to the second preset frame rate.

In an example, after determining the preset frame rate corresponding to the second time period, the electronic device may call the API of the operating system based on the reflection mechanism of the operating system, find the specific class of the operating system, and call and transmit a parameter index through the invoke method. The index indicates the frame rate gear that needs to be switched. In this way, the operating system of the electronic device may determine the frame rate for rendering the image in the second time period based on the index, and render the image in the second time period based on the frame rate. The invoke method will not be repeated in detail.

Based on the solution shown in FIG. 5, the electronic device may determine the preset frame rate in the next time period of the first time period based on the plurality of frame rates of the at least one first time period. That is, the electronic device may dynamically adjust the preset frame rate in the next time period based on the plurality of frame rates of the current time period. In this way, the electronic device may adaptively adjust the preset frame rate based on the actual image rendering capability.

Figure 6:
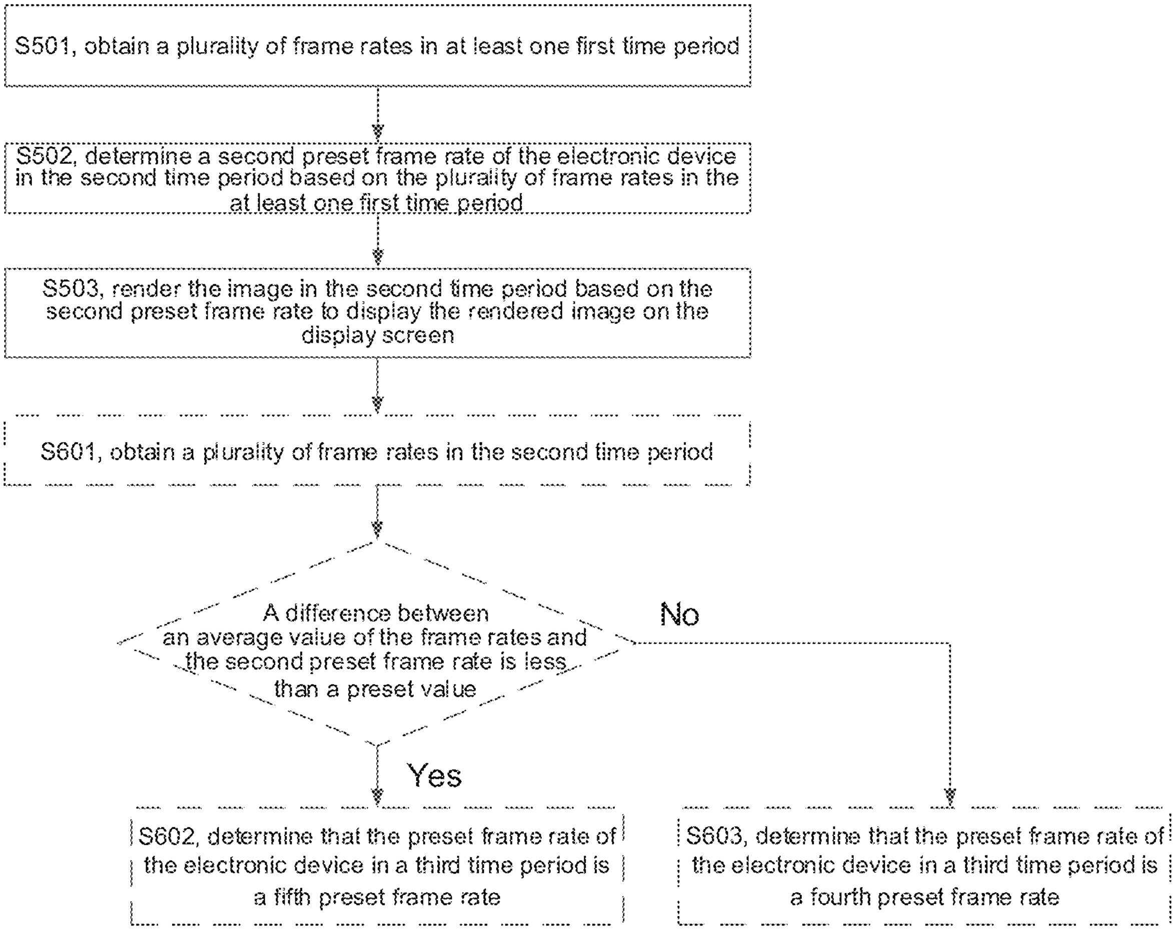
FIG. 6 is a flow diagram of an image processing method, in accordance with some embodiments.

In some embodiments, as shown in FIG. 6, the method further includes S601 to S603.

In S601, a plurality of frame rates in the second time period are obtained.

The plurality of frame rates may refer to frame rates actually used by the electronic device when rendering images in the second time period.

In S602, in a case where a difference between the average value of the frame rates and the second preset frame rate is less than a preset value, it is determined that the preset frame rate of the electronic device in the third time period is a fifth preset frame rate.

The fifth preset frame rate is a preset frame rate that is greater than the second preset frame rate among the plurality of preset frame rates.

In a possible implementation, in a case where the difference between the average value of the frame rates and the second preset frame rate is less than the preset value, the fifth preset frame rate is a frame rate that is greater than the second preset frame rate among the plurality of preset frame rates.

In an example, with reference to the plurality of preset refresh rates in S501, the preset value is 2. In a case where the preset frame rate of the electronic device in the second time period is 110 fps, and the average value of the frame rates in the second time period is 109 fps, since $110-109=1<5$, it means that the frame rate of the electronic device in the second time period is relatively stable. In this way, the electronic device may increase the preset frame rate. For example, the preset frame rate in the third time period may be adjusted to 115 fps. Subsequently, in the third time period, if the difference between the average value of the frame rates and 115 fps is less than the preset value, the electronic device may continue to increase the preset frame rate. That is, the electronic device adjusts the preset frame rate to 120 fps. In a case where the electronic device increases the preset frame rate to the maximum preset frame rate among the plurality of preset frame rates, if a difference between the an average value of the frame rates in the next time period and the maximum preset frame rate is less than the preset value, the electronic device may maintain the maximum preset frame rate.

In this way, in a case where the frame rate of the electronic device is relatively stable, the upper limit of the preset frame rate of the electronic device may be increased to improve the utilization of the graphics card.

In another example, the electronic device may determine the preset frame rate of the electronic device in the third time period based on the average value of the frame rates in each of the at least one first time period and the plurality of frame rates in the second time period.

In S603, in a case where the difference between the average value of the frame rates and the second preset frame rate is greater than or equal to the preset value, it is determined that the preset frame rate of the electronic device in the third time period is a fourth preset frame rate.

The fourth preset frame rate is a preset frame rate that is less than the second preset frame rate among the plurality of preset frame rates.

In an example, the difference between the average value of the frame rates and the second preset refresh rate is greater than the preset value, which means that the image rendering capability of the graphics card of the electronic device in the second time period cannot reach the second preset preset rate. Therefore, the electronic device may continue to reduce the preset frame rate of the electronic device, and render the image in the third time period based on the reduced preset frame rate.

In another example, in a case where the difference between the average value of frame rates and the second preset refresh rate is greater than a first threshold and less than or equal to a second threshold, the electronic device may continue to render the image in the third time period by using the second preset frame rate. The second threshold is greater than the first threshold. The difference between the two is greater than the first threshold and less than or equal to the second threshold, which means that the image rendering capability of the electronic device cannot reach the second preset frame rate, but is close to the second preset frame rate. The electronic device may render the image in the third time period based on the second preset frame rate to ensure the utilization of the GPU to the greatest extent.

For another example, in a case where the difference between the average value of the frame rates and the second preset frame rate is greater than the second threshold, the electronic device may render the image in the third time period based on the fourth preset frame rate.

Based on the solution in FIG. 6, in a case where the refresh rate of the image is relatively stable in multiple consecutive time periods, the electronic device may increase the preset frame rate. Thus, a higher frame rate may be used to render the image in subsequent time periods, so that the graphics card is utilized to the greatest extent.

Figure 7:
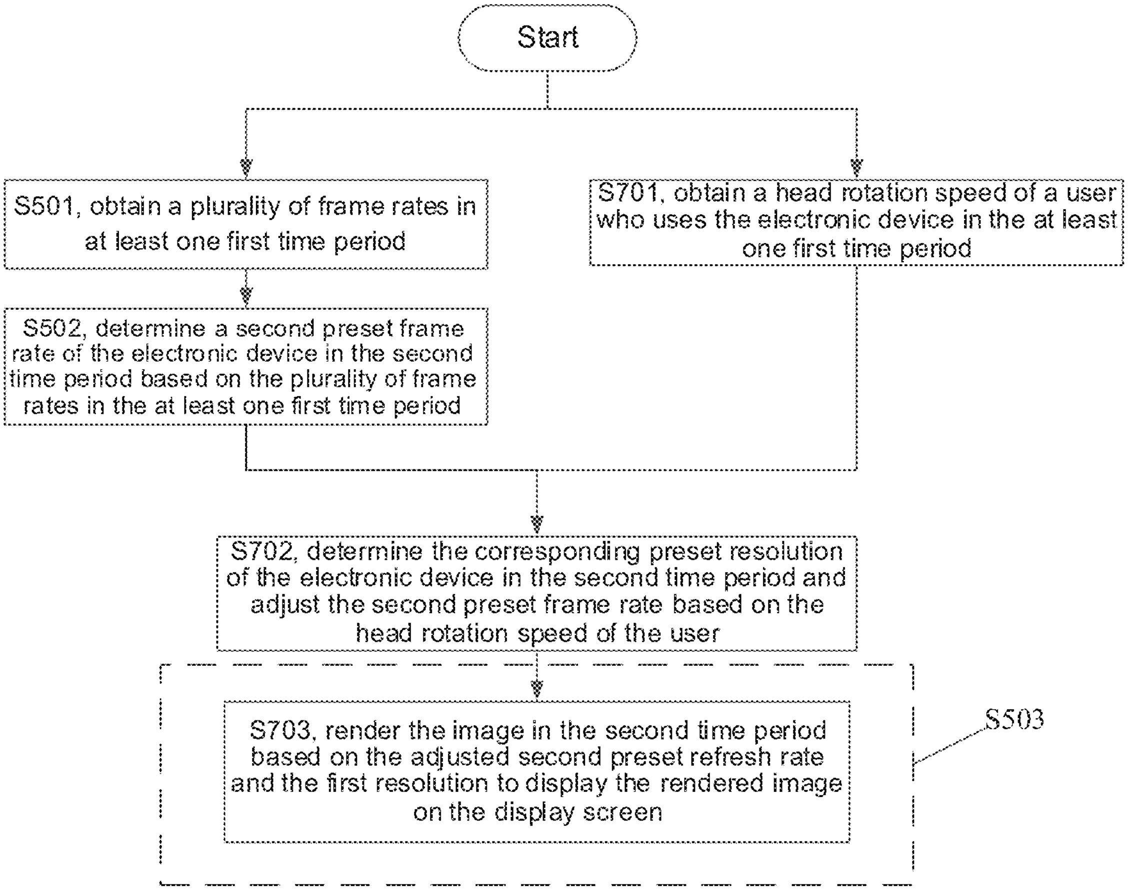
FIG. 7 is a flow diagram of an image processing method, in accordance with some embodiments.

In some embodiments, as shown in FIG. 7, the method provided by the embodiments of the present disclosure further includes S701 and S702.

In S701, a head rotation speed of a user who uses the electronic device in the at least one first time period is obtained.

The head rotation speed of a user may refer to head rotation angular rate per unit time of the user. For example, if a head rotation angle of the user is 50° in a certain time period (e.g., 0.5 seconds (s)), then the head rotation speed of the user in this time period is 50/0.5=100°/s.

In a possible implementation, the electronic device may be provided with one or more sensors. The one or more sensors may be used to detect the head rotation speed of the user. In this way, the electronic device may obtain the head rotation speed of the user who uses the electronic device in the second time period through the one or more sensors.

In another possible implementation, in a case where the electronic device is a head-mounted device, the electronic device may be provided with a gyroscope. The gyroscope may be used to obtain the head rotation speed of the user. In this way, the electronic device may use the gyroscope to obtain the head rotation speed of the user who uses the electronic device in the second time period.

In an example, the electronic device may obtain the linear acceleration of the gyroscope in multiple directions, and calculate the respective velocity component (i.e., the head rotation speed of the user) based on the linear acceleration in each direction.

Further, in order to more accurately determine the motion state of the user, the electronic device may obtain multiple sets of velocity data from the gyroscope. A set of velocity data includes the respective velocity component corresponding to each direction. Abnormal data in multiple sets of velocity data (e.g., a set of velocity data that suddenly increases/decreases) may be deleted. In this way, it is possible to avoid the jumping phenomenon.

In yet another possible implementation, in a case where the electronic device is a television or a mobile device, the electronic device may capture multiple frames of head images of the user in the second time period through the camera, and identify the multiple frames of head images to determine the head rotation angle of the user. Further, the electronic device may determine the head rotation speed of the user based on a ratio of the head rotation angle of the user to the second time period.

In S702, based on the head rotation speed of the user, the corresponding preset resolution of the electronic device in the second time period is determined, and the second preset frame rate is adjusted.

The head rotation speed of the user is inversely proportional to the preset resolution. That is, the greater the head rotation speed of the user, the less attention the user pays to the display screen. Thus, the electronic device may use a low resolution to render the image to reduce the power consumption of the electronic device. The less the head rotation speed of the user, the more attention the user pays to the display screen. Thus, the electronic device may use a high resolution to render the image to improve the high definition of the image and enhance the user experience.

Adjusting the second preset frame rate based on the head rotation speed of the user by the electronic device includes: in a case where the head rotation speed of the user is greater than a preset speed, adjusting the preset frame rate in the second time period to a preset frame rate that is greater than the second preset frame rate among the plurality of preset frame rates; and in a case where the head rotation speed of the user is less than or equal to the preset speed, adjusting the preset frame rate in the second time period to a preset frame rate that is less than the second preset frame rate among the plurality of preset frame rates.

In a possible implementation, the electronic device may be configured with a plurality of preset resolutions (for example, including a first preset resolution and a second preset resolution, the first preset resolution being less than the second preset resolution). In a case where the head rotation speed of the user in the first time period is greater than or equal to the preset speed, the electronic device may set the preset resolution to the first preset resolution; in a case where the head rotation speed of the user in the first time period is less than the preset speed, the electronic device may set the preset resolution to the second preset resolution.

Thus, in a case where the electronic device determines that the user is in a motion state, the electronic device may reduce the resolution, so that the power consumption of the electronic device may be reduced; in a case where the electronic device determines that the user is in a stationary state, the electronic device may increase the resolution, so that the user experience may be improved.

Furthermore, the electronic device may also be configured with more preset resolutions and a head rotation speed range corresponding to each preset resolution. In this way, the electronic device may determine a head rotation speed range that matches the head rotation speed based on the head rotation speed of the user, and determine a corresponding preset resolution based on the head rotation speed range.

It will be noted that after the electronic device sets a preset resolution in a certain time period, the resolution of the electronic device rendering image in this time period is less than or equal to the preset resolution.

In another possible implementation, the electronic device may determine whether the user is in a stationary state or in a motion state based on the velocity components of the gyroscope in various directions. For example, if the speed components of the gyroscope in all directions are all less than the corresponding preset speed, the electronic device may determine that the user is in a stationary state. If there is a velocity component greater than or equal to the preset speed among the velocity components of the gyroscope in all directions, the electronic device may determine that the user is in a motion state.

For multiple sets of speed data, if the velocity components in the multiple sets of speed data are all greater than the corresponding preset speed, or if the velocity components in set(s) of speed data whose number exceed the preset number of speed data (e.g., 6 sets of speed data in 10 sets of speed data) are greater than the corresponding preset speed, the electronic device may determine that the user is in a motion state.

In a possible implementation, in a case where the user is in a motion state, the electronic device may adjust the second preset frame rate to the third preset frame rate, and the third preset frame rate is a preset frame rate that is greater than the third preset frame rate among the plurality of preset frame rates; in a case where the user is in a stationary state, the electronic device may adjust the second preset frame rate to the fourth preset frame rate, and the fourth preset frame rate is a preset frame rate that is smaller than the second preset frame rate among the plurality of preset frame rates.

In an example, a ratio of the second preset resolution to the first preset resolution is less than or equal to a ratio of the third preset frame rate to the fourth preset frame rate. For example, the third preset frame rate is 120 fps, and the fourth preset frame rate is 30 fps. Then the ratio of the second preset resolution to the first preset resolution may be less than or equal to 4. For example, the first preset resolution may be 676×720, and the second preset resolution may be 1352×1440.

Based on the solution shown in FIG. 7, the electronic device may flexibly adjust the resolution of the electronic device based on the head rotation speed of the user. In a case where the head rotation speed of the user is high, a low resolution may be used to render the image to reduce the power consumption of the electronic device. In a case where the head rotation speed of the user is slow, a high resolution may be used to render the image to improve the user experience.

In some embodiments, as shown in FIG. 7, the method of rendering the image in the second time period based on the second preset refresh rate to display the rendered image on the display screen in S503 may be implemented by S703.

In S703, the image is rendered in the second time period based on the adjusted second preset refresh rate and the first resolution to display the rendered image on the display screen.

Based on these embodiments, the electronic device may render the image based on the preset resolution and frame rate. Since the resolution is related to the head rotation speed of the user, and the frame rate is related to the plurality of frame rates in the previous time period, the electronic device may render the image based on the resolution and refresh rate, which is flexible and convenient.

In an example, in the initial power-on period of the electronic device, the preset frame rate of the electronic device may be the maximum value among the plurality of preset frame rates.

Furthermore, in the embodiments of the present disclosure, the electronic device may determine the refresh rate in the second time period based on the refresh rate of multiple consecutive frames of images in at least one first time period. The preset frame rate in Embodiment 1 may be replaced with a preset refresh rate.

It will be noted that in Embodiment 1, the electronic device determines the actual resolution to be used in rendering an image in each time period taking into account the gazing region of the user and the image complexity of the image in the gazing region. That is, after the electronic device determines the preset resolution in a certain time period, the electronic device may adjust the resolution based on the gazing region of the user and the image complexity of the image in the gazing region in this time period.

Reference may be made to the description of Embodiment 2 below.

Embodiment 2

Figure 8:
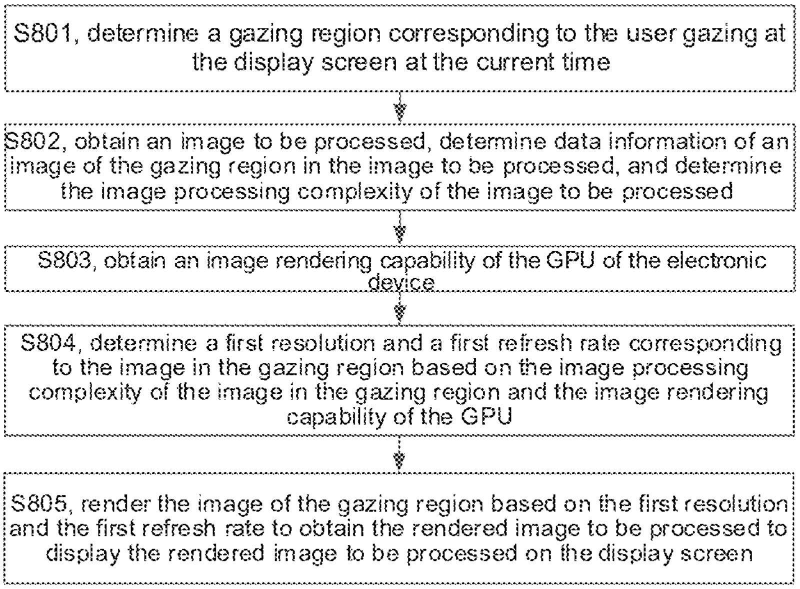
FIG. 8 is a flow diagram of an image processing method, in accordance with some embodiments.

As shown in FIG. 8, which is the image processing method provided by the embodiments of the present disclosure, the method may be applied to the electronic device shown in FIG. 1. The method may include S801 to S804.

In S801, a gazing region corresponding to the user gazing at the display screen at the current time is determined.

The gazing region is in a preset shape, for example, may be in a shape of a rectangle. The size of the gazing region is a preset area. The center point of the gazing region is a gaze point of the user. The gaze point of the user may be the pupil coordinates of the user.

In a possible implementation, the electronic device may determine the gazing region corresponding to the user based on the pupil coordinates of the user at the current time.

In an example, the electronic device may capture an eye image of the user through an infrared camera, identify the eye image of the user, and obtain the gaze point of the user's eyes (i.e., the gaze direction of the pupils). Then, the electronic device may input the gaze point of the user's eyes into the preset pupil coordinate determination model to obtain the pupil coordinates of the user. The preset pupil coordinate determination model may be used to determine the pupil coordinates of the user.

In another example, the electronic device may be configured with a preset coordinate system. An origin of the preset coordinate system may be a point in the display region (e.g., the lower left corner of the display region). The two coordinate axes of the preset coordinate system are respectively parallel to the border lines of the display region. After determining the gaze point of the user's eyes, the electronic device may map the gaze point of the user's eyes to the preset coordinate system to obtain the pupil coordinates of the user.

After determining the pupil coordinates of the user, the electronic device may expand a region by taking the pupil coordinates as the center until the region is extended to have a preset area, so as to obtain the gazing region of the user.

For example, the electronic device may take the upper and lower borders of the display region as the borders of the gazing region, and take the pupil coordinates as the starting point to extend the region by a preset length to the left and right sides of the display region to obtain the gazing region. The product of the preset length and a distance between the upper and lower borders of the display region (i.e., the width of the display region) is the preset area.

In S802, an image to be processed is obtained, data information of an image of the gazing region in the image to be processed is determined, and the image processing complexity of the image to be processed is determined.

The image to be processed may refer to an image that the electronic device needs to display at the current moment. The data information of the image to be processed may refer to the number of objects, the number of layers and the like included in the image to be processed. The objects may refer to people, physical objects, and the like included in the image to be processed. Image processing complexity may also be referred to as image complexity, complexity, picture complexity, complexity level, scene complexity, or the like. Image processing complexity may be used to indicate the processing resources required to render an image. The higher the image processing complexity of an image, the more processing resources are required to render the image.

In a possible implementation, the electronic device may obtain multiple consecutive frames of video data in response to a play operation of the user. In this way, the electronic device may acquire all frames of images in sequence and process all the frames of images. If the image displayed by the electronic device at the current moment is Image 1, the next frame of Image 1 is used as the image to be processed.

After determining the gazing region, the electronic device may determine the size of the image of the gazing region based on the product of the image to be processed and a first value. The first value may be a ratio of the area of the gazing region to the area of the display region of the display screen. Further, after determining the size of the image of the gazing region, position information of the image of the gazing region in the image to be processed may be determined based on the coordinate information of the gaze point. The center point of the image of the gazing region in the image to be processed is the coordinate information of the gaze point. Furthermore, the electronic device may analyze and identify the image of the gazing region to obtain the data information of the image of the gazing region.

For example, the electronic device may identify the image of the gazing region to determine the number of objects in the image of the gazing region. For example, the electronic device may perform clustering based on the pixels of the image in the gazing region to obtain the number of clusters in the image in the gazing region. A cluster corresponds to an object. For another example, the electronic device may analyze the image of the gazing region to obtain the number of layers of the image of the gazing region.

For another example, the electronic device may process the image of the gazing region based on a preset recognition algorithm to obtain the data information of the image of the gazing region. Alternatively, the electronic device may input the image of the gazing region into a preset detection model to obtain the data information of the image of the gazing region. The preset detection model is used to determine the data information of the image.

In another possible implementation, after determining the data information of the image of the gazing region, the electronic device may determine the complexity of the image of the gazing region based on the data information of the image of the gazing region.

In an example, the electronic device may determine the image processing complexity of the image of the gazing region based on the data information of the image of the gazing region and a preset complexity database.

The preset complexity database may be pre-configured for the electronic device. The preset complexity database includes a corresponding relationship between the data information of the image and the image processing complexity. For example, considering an example in which the data information includes the number of objects in the image, the preset complexity database includes a corresponding relationship between the number of objects and the image processing complexity. The larger the number of objects, the greater the corresponding image processing complexity. In this way, the electronic device may quickly and accurately determine the image processing complexity of the image of the gazing region based on the preset complexity database.

In S803, an image rendering capability of the GPU of the electronic device is obtained.

The image rendering capability of the GPU may refer to the amount of image data that the GPU capable of rendering at the current time. For example, the electronic device obtains the image rendering capability of the GPU through the GPU performance monitoring module.

In S804, a first resolution and a first refresh rate corresponding to the image in the gazing region are determined based on the image processing complexity of the image in the gazing region and the image rendering capability of the GPU.

In a possible implementation, the electronic device determines a target resolution and target refresh rate (which is referred to as an optimal resolution and optimal refresh rate) of the image to be processed based on the image rendering capability of the GPU, the image processing complexity of the image to be processed and a first preset corresponding relationship.

As for the method for determining the image processing complexity of the image to be processed, reference may be made to the image processing complexity of the image of the gazing region mentioned above, which is not repeated.

The first preset corresponding relationship may be a corresponding relationship between the image rendering capability of the GPU and the resolution and refresh rate. The product of the target resolution and the target refresh rate is a preset parameter value. The preset parameter value is related to the configuration information of the electronic device. The configuration information of the electronic device may include the type and capability of the processor, the type and capability of the GPU, and the operating system of the electronic device. For example, the preset parameter value may be the dot_clk value of the electronic device.

It will be noted that in the embodiments of the present disclosure, the target resolution and target refresh rate are related to the complexity of the image to be processed. In a case where the complexity of the image to be processed is high, a low resolution may be used to avoid the phenomenon of image lag, so that the power consumption of the electronic device may be reduced. In a case where the complexity of the image to be processed is low, a high resolution may be used to improve the user experience.

For example, the electronic device determines multiple resolutions based on the image rendering capability of the GPU and the image processing complexity and the first preset corresponding relationship. For example, the resolutions determined by the electronic device include Resolution 1 and Resolution 2, and Resolution 1 is greater than Resolution 2. In a case where the image processing complexity is greater than or equal to a preset level, the target resolution may be Resolution 2; in a case where the image processing complexity is less than the preset level, the target resolution may be Resolution 1.

For another example, in a case where there is 1 determined resolution (e.g., Resolution 3), and the image processing complexity is greater than the preset level, the electronic device may reduce Resolution 3 and use the reduced Resolution 3 as the target resolution. For the determined refresh rate, the electronic device may increase the refresh rate and use the increased refresh rate as the target refresh rate. Alternatively, the electronic device may not adjust the determined refresh rate.

Further, after determining the target resolution and target refresh rate of the image to be processed, the electronic device determines the image of the gazing region and the image processing complexity of the image of the gazing region, and determines the first resolution based on the image processing complexity of the image of the gazing region and the target resolution. The first refresh rate is the target refresh rate.

The image of the gazing region in the image to be processed is determined based on the position of the gazing region in the display region. As for the method for determining the image processing complexity of the image of the gazing region, reference may be made to the method for determining the image processing complexity of the image to be processed described above, which will not be repeated.

In an example, the electronic device calculates the first resolution based on the product of the first value and the target resolution. The first value is greater than 0 and less than 1. The first value may be related to the image processing complexity of the image of the gazing region. For example, the first value may be a sum of a ratio of the image processing complexity of the image in the gazing region to the image processing complexity of the image to be processed and a preset adjustment coefficient. The preset adjustment coefficient is greater than 0. The preset adjustment coefficient may be set as needed.

In S805, the image of the gazing region is rendered based on the first resolution and the first refresh rate to obtain the rendered image to be processed to display the rendered image to be processed on the display screen.

According to the solution in FIG. 8, the electronic device can solve the problem of image lag. Compared with the fixed resolution, the solution provided by the embodiments of the present disclosure flexibly adjusts the resolution of the image based on the image processing complexity of the image to be processed. The electronic device determines the gazing region of the user based on the pupil coordinates of the user. Then, the electronic device determines the resolution and refresh rate corresponding to the image in the gazing region based on the image processing complexity of the image to be processed and the image rendering capability of the GPU, and renders the image of the gazing region. Since the resolution and refresh rate corresponding to the image of the gazing region are related to the gaze point of the user, in the embodiments of the present disclosure, the electronic device capable of adaptively and flexibly adjusting the resolution due to the gaze point of the user and the complexity of the image. Therefore, compared with rendering the image by using a fixed resolution, the solution of the embodiments of the present disclosure capable of flexibly adjusting the resolution based on the image processing complexity of the image, thereby improving the smoothness of the display of the image.

Figure 9:
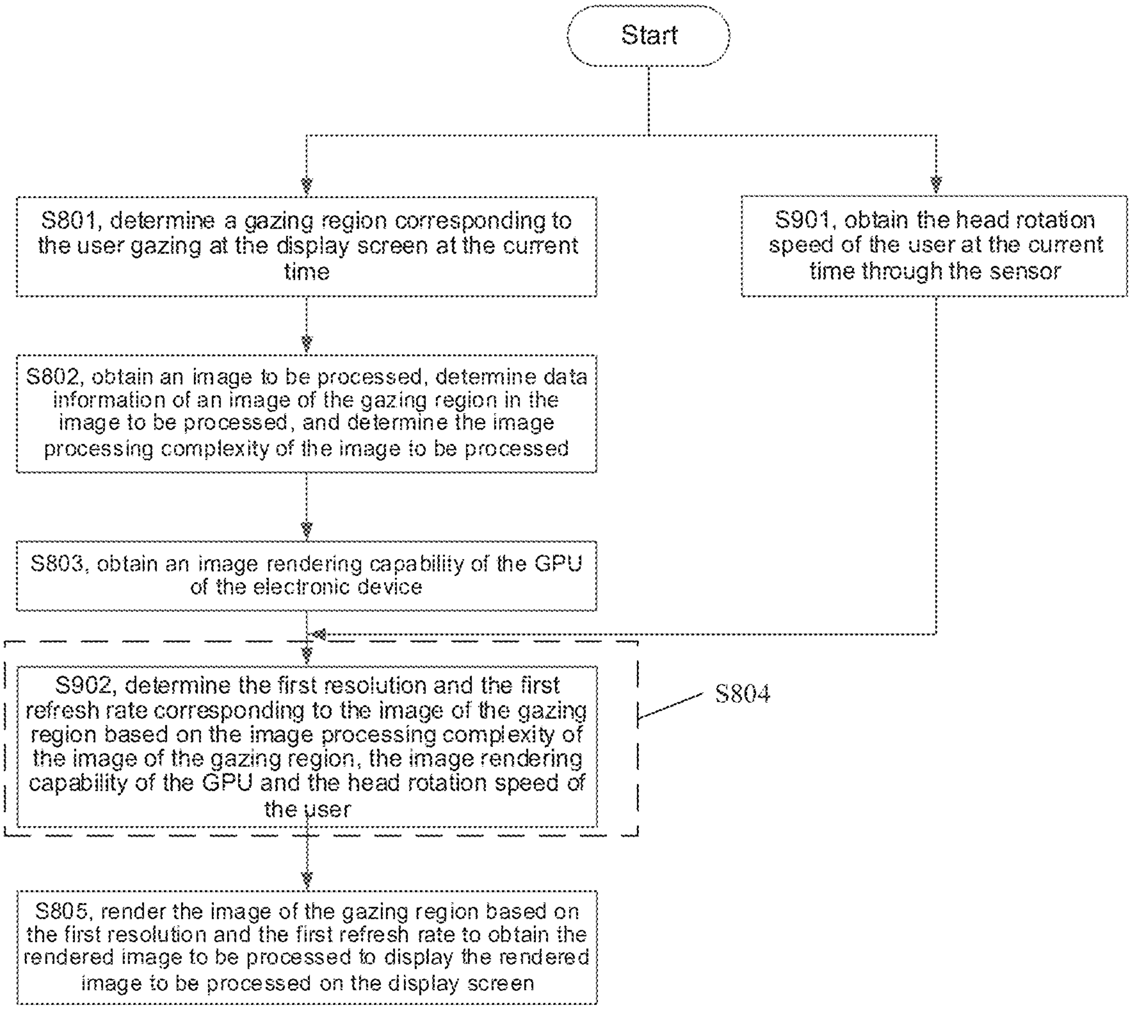
FIG. 9 is a flow diagram of an image processing method, in accordance with some embodiments.

In some embodiments, as shown in FIG. 9, in a case where the electric device is configured with a sensor, the method further includes S901.

In S901, the head rotation speed of the user at the current time is obtained through the sensor.

The sensor may be a head sensor. The sensor is used to obtain the head rotation speed of the user. For example, in a case where the electronic device is a head-mounted device (e.g., a VR device), the sensor may detect the head rotation speed of the user in real time. For another example, in a case where the electronic device is a mobile terminal, the sensor may capture head images of the user at multiple moments through the camera of the electronic device, and determine the head rotation speed based on the multiple head images of the user. For example, in the head image at a first moment, the head of the user is located at Position 1; in the head image at a second moment, the head of the user is located at Position 2. The first moment is a moment before the second moment. Then the head rotation speed of the user is equal to: (Position 2−Position 1)/(the second moment−the first moment).

In a possible implementation, the sensor start to detect the head rotation speed of the user in response to a user's operation of triggering playback of video, and send the detected head rotation speed of the user to the processor of the electronic device.

Furthermore, S804 may be implemented through S902.

In S902, the first resolution and the first refresh rate corresponding to the image of the gazing region are determined based on the image processing complexity of the image of the gazing region, the image rendering capability of the GPU and the head rotation speed of the user.

The head rotation speed of the user is inversely proportional to the resolution of the image. The head rotation speed of the user may be used to reflect how much attention the user pays to the image. The greater the head rotation speed of the user, the less attention the user pays to the image. The less the head rotation speed of the user, the high attention the user pays to the image.

In an example, after determining the resolution and refresh rate of the image of the gazing region based on the data information of the image of the gazing region and the image rendering capability of the GPU, the electronic device adjusts the resolution of the image of the gazing region based on the head rotation speed of the user, and use the adjusted resolution as the first resolution.

For example, in a case where the head rotation speed of the user is greater than or equal to the preset speed, the electronic device may reduce the resolution of the image of the gazing region; in a case where the head rotation speed of the user is less than the preset speed, the electronic device may increase the resolution of the image of the gazing region. For example, the electronic device adjusts the resolution of the image by using the preset coefficient.

It will be noted that the refresh rate may be adjusted by the electronic device or remain the same. For example, in order to reduce the calculation amount of the electronic device, the electronic device may not adjust the refresh rate of the gazing region. For another example, in order to reduce the power consumption of the electronic device when rendering images, the electronic device may reduce the refresh rate of the image of the gazing region.

In another example, the electronic device determines the first resolution and the first refresh rate based on the data information of the image of the gazing region, the image rendering capability of the GPU, the head rotation speed of the user, and a second preset corresponding relationship.

The second preset corresponding relationship is a corresponding relationship between the data information of the image, the image rendering capability of the GPU, the head rotation speed and the resolution and refresh rate. The second preset corresponding relationship may be pre-configured for the electronic device.

According to the solution in FIG. 9, the electronic device may flexibly adjust the resolution of the gazing region based on the head rotation speed of the user.

Figure 10:
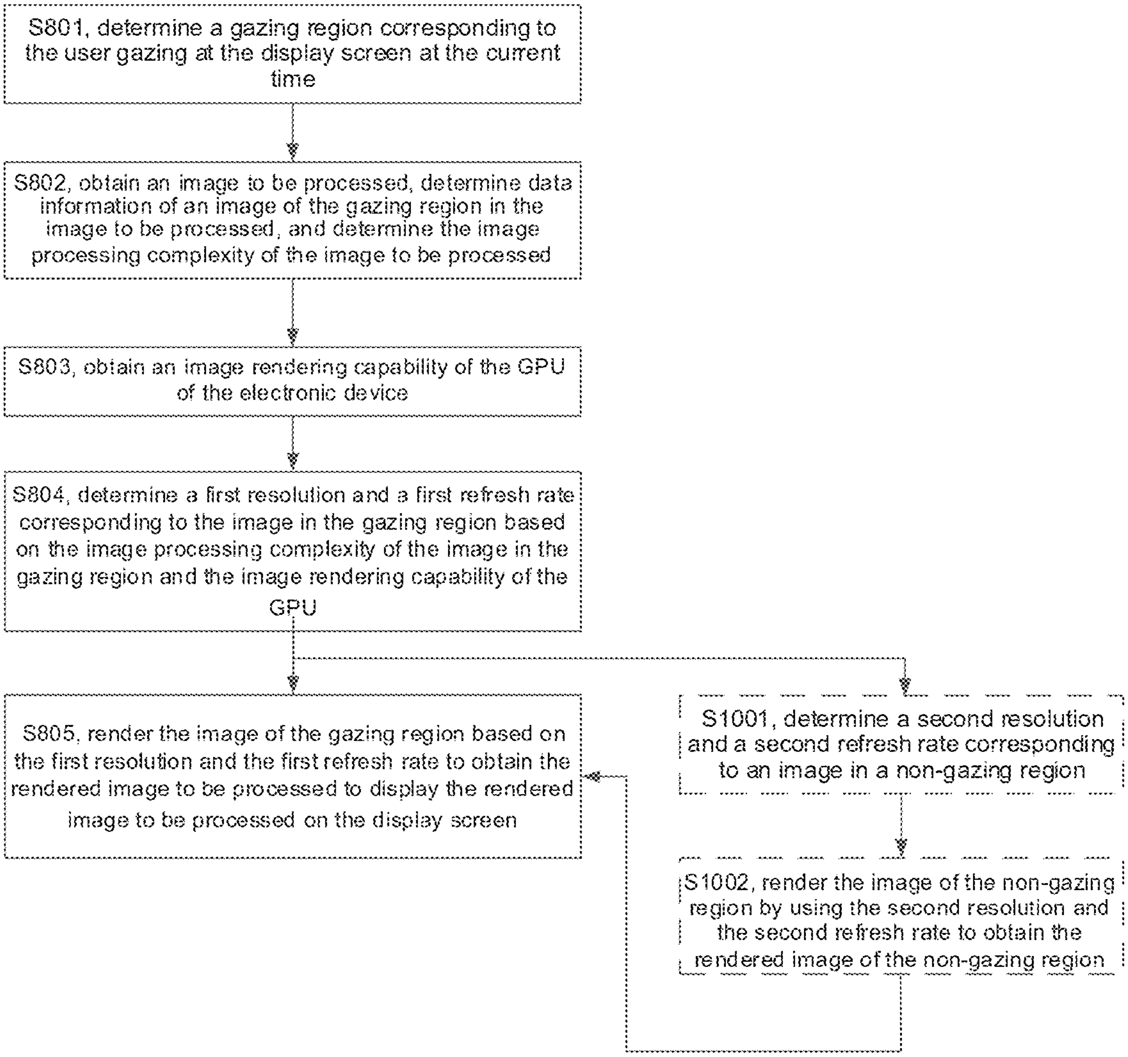
FIG. 10 is a flow diagram of an image processing method, in accordance with some embodiments.

In some embodiments, as shown in FIG. 10, the method further includes S1001 to S1002.

In S1001, a second resolution and a second refresh rate corresponding to an image in a non-gazing region are determined.

The non-gazing region refers to a region in the display region of the display except for the gazing region. The second resolution is less than the first resolution. For example, after determining the target resolution, the electronic device determines the second resolution based on a difference between the target resolution and the first resolution. Alternatively, the electronic device may reduce the first resolution and use the reduced first resolution as the second resolution. A sum of the first resolution and the second resolution is less than or equal to the target resolution.

For example, in order to reduce the calculation amount of the electronic device, the electronic device may use the first refresh rate as the refresh rate of the image of the non-gazing region; that is, the first refresh rate is equal to the second refresh rate. For another example, in order to reduce the power consumption of the electronic device, the electronic device may reduce the first refresh rate and use the reduced first refresh rate as the second refresh rate.

In S1002, the image of the non-gazing region is rendered by using the second resolution and the second refresh rate to obtain the rendered image of the non-gazing region.

According to the solution in FIG. 10, for the image of the non-gazing region, the electronic device may render the image by using a low resolution and refresh rate to reduce the power consumption of image rendering.

Figure 11:
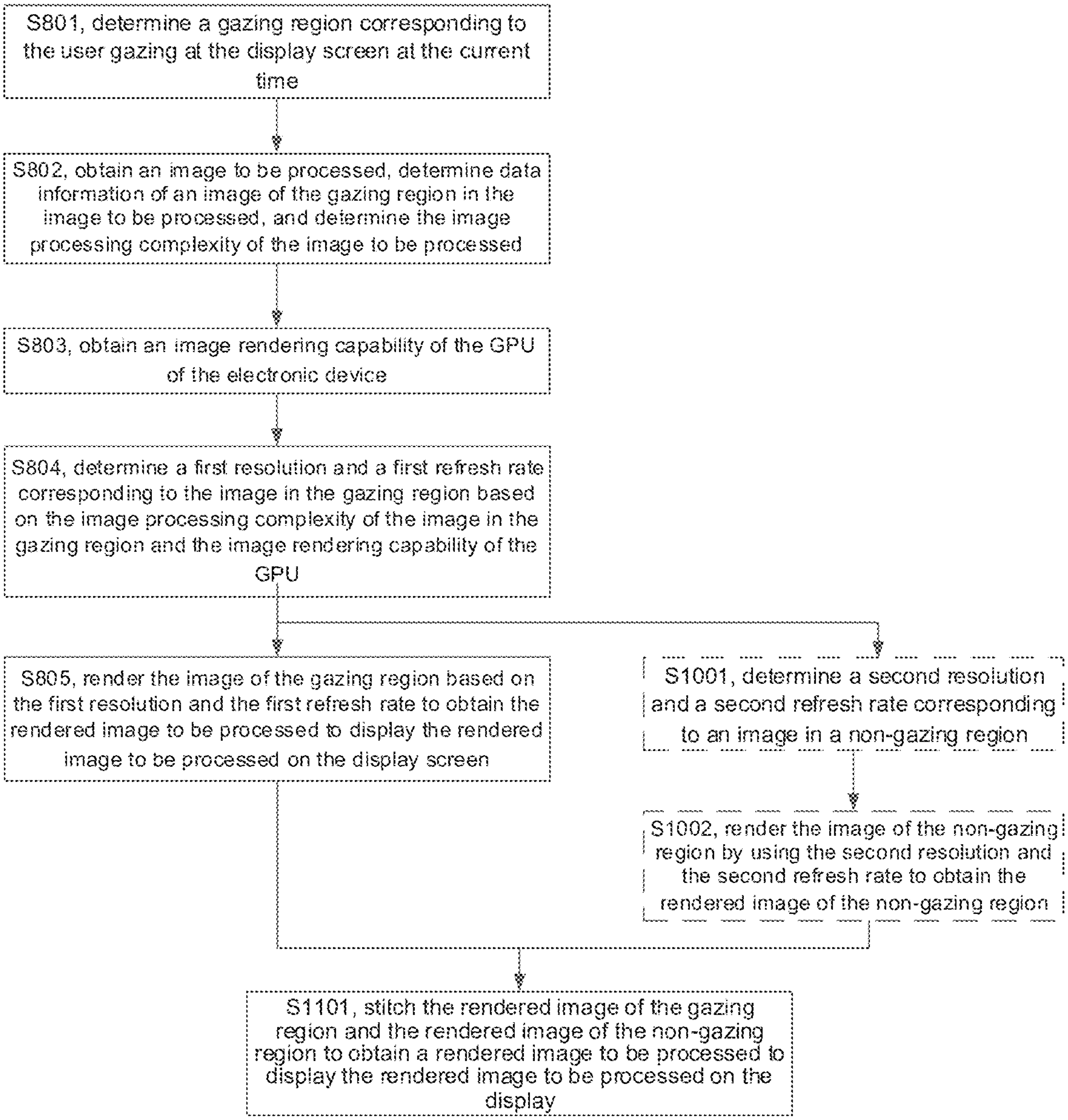
FIG. 11 is a flow diagram of an image processing method, in accordance with some embodiments.

In some embodiments, with reference to FIG. 10, as shown in FIG. 11, the method further includes S1101.

In S1101, the rendered image of the gazing region and the rendered image of the non-gazing region are stitched to obtain a rendered image to be processed to display the rendered image to be processed on the display.

After rendering the image of the gazing region and the image of the non-gazing region, the electronic device may perform a stitching processing (also referred to as patching processing) on the images of the two regions to obtain the rendered image to be processed, so as to ensure the integrity of the image to be processed.

In an example, after rendering the image of the gazing region and the image of the non-gazing region, the GPU may transmit the rendered image of the gazing region and the rendered image of the non-gazing region to the software layer of the electronic device through the API. The software layer of the electronic device may perform the stitching processing on the rendered image of the gazing region and the rendered image of the non-gazing region to obtain the rendered image to be processed. Then, the software layer of the electronic device may transmit the rendered image to be processed to the display module/display, so that the display displays the rendered image to be processed.

According to the solution in FIG. 11, the electronic device may stitch the rendered image of the gazing region and the rendered image of the non-gazing region, and display the stitched image on the display. Since the image of the gazing region in the stitched image is a high-definition image, the user's demand for high-definition images is met.

Figure 12:
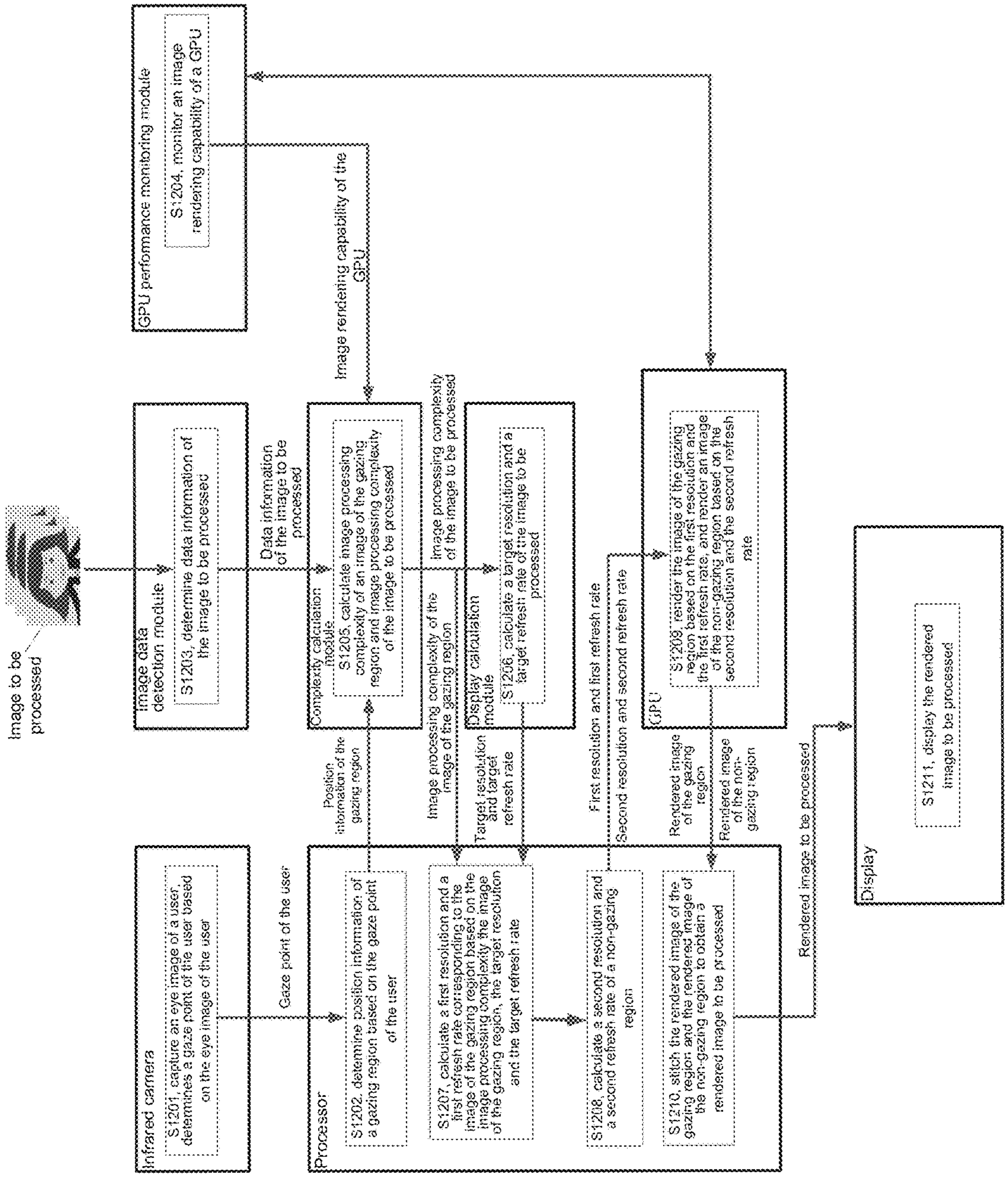
FIG. 12 is a flow diagram of an image processing method, in accordance with some embodiments.

In some embodiments, as shown in FIG. 12, the embodiments of the present disclosure provide an image processing method, and the method includes S1201 to S1211.

In S1201, an infrared camera captures an eye image of a user, determines a gaze point of the user based on the eye image of the user, and transmits the gaze point of the user to a processor.

In S1202, the processor determines position information of a gazing region based on the gaze point of the user, and transmits the position information of the gazing region to a complexity calculation module.

For S1201 and S1202, reference may be made to the description of S802, which will not be repeated.

In S1203, an image data detection module determines data information of an image to be processed, and sends the data information of the image to be processed to the complexity calculation module.

In S1204, a GPU performance monitoring module monitors an image rendering capability of a GPU, and transmits the image rendering capability of the GPU to the complexity calculation module.

In S1205, the complexity calculation module calculates image processing complexity of an image of the gazing region and image processing complexity of the image to be processed, and transmits the image processing complexity of the image of the gazing region and the image processing complexity of the image to be processed to the processor.

For S1203 to S1205, reference may be made to the description of S801, which will not be repeated.

In S1206, a display calculation module calculates a target resolution and a target refresh rate of the image to be processed.

In S1207, the processor calculates a first resolution and a first refresh rate corresponding to the image of the gazing region based on the image processing complexity the image of the gazing region, the target resolution and the target refresh rate.

In S1208, the processor calculates a second resolution and a second refresh rate of the non-gazing region, and transmits the first resolution, the first refresh rate, the second resolution and the second refresh rate to the GPU.

For S1206 and S1208, reference may be made to the description of S803, which will not be repeated.

In S1209, the GPU renders the image of the gazing region based on the first resolution and the first refresh rate, renders an image of the non-gazing region based on the second resolution and the second refresh rate, and transmits the rendered image of the gazing region and the rendered image of the non-gazing region to the processor.

In S1210, the processor stitches the rendered image of the gazing region and the rendered image of the non-gazing region to obtain a rendered image to be processed, and sends the rendered image to be processed to a display.

In S1211, the display displays the rendered image to be processed.

According to the solution in FIG. 12, the electronic device is capable of solving the problem of image lag. Compared with the fixed resolution, the solution provided by the embodiments of the present disclosure flexibly adjusts the resolution of the image based on the image processing complexity of the image to be processed. Specifically, the electronic device determines the gazing region of the user based on the pupil coordinates of the user. Then, the electronic device determines the resolution and refresh rate corresponding to the image in the gazing region based on the image processing complexity of the image to be processed and the image rendering capability of the GPU, and renders the image of the gazing region. Since the resolution and refresh rate corresponding to the image of the gazing region are related to the gaze point of the user, in the embodiments of the present disclosure, the electronic device capable of adaptively and flexibly adjusting the resolution due to the gaze point of the user and the complexity of the image. Therefore, compared with the fixed resolution, the smoothness of the display of the images may be improved.

In some embodiments, the method provided by the embodiments of the present disclosure may further include: obtaining the power consumption of the electronic device, and adjusting at least one of the resolution, refresh rate, or frame rate of the electronic device according to the power consumption of the electronic device.

The power consumption of the electronic device may include power of the electronic device for rendering images. For example, the electronic device may obtain the current and voltage of the electronic device, and calculate the power consumption of the electronic device based on the current and voltage.

In an example, in a case where the power consumption of the electronic device in the first time period is greater than the preset power consumption, the electronic device may reduce at least one of the resolution, refresh rate, or frame rate of the electronic device.

For example, the electronic device renders the image by using the first preset resolution, the first refresh rate, and the first preset frame rate in the first time period. In a case where the power consumption of the electronic device in the first time period is greater than the preset power consumption, the electronic device renders the image by using the second preset resolution, and/or the second refresh rate, and/or the first preset time period in the second time period. The second preset resolution is less than the first preset resolution. The second refresh rate is less than the second refresh rate. The second preset frame rate is less than the first preset frame rate.

Further, the electronic device may also adjust at least one of the resolution, refresh rate or frame rate in the first time period according to the current remaining electric quantity of the electronic device, and render the image by using the adjusted resolution, refresh rate or frame rate in the second time period.

The resolution after adjustment is less than the resolution before adjustment. The refresh rate after adjustment is less than the resolution before adjustment. The frame rate after adjustment is less than the frame rate before adjustment.

It will be noted that in the embodiments of the present disclosure, in the above description of the determine condition based on a preset threshold, for example, higher than may be replaced by higher than or equal to, lower than or equal to may be replaced by lower than; greater than or equal to may be replaced by greater than, less than may be replaced by less than or equal to; higher than or equal to may be replaced by higher than, less than may be replaced by less than or equal to; greater than may be replaced by greater than or equal to, less than or equal to may be replaced by less than.

It will be noted that the embodiments of the present disclosure may draw reference from each other. For example, the same or similar steps, method embodiments, system embodiments and device embodiments may all be referred to each other without limitation.

In some embodiments of the present disclosure, an image processing apparatus may be divided into functional modules or functional units according to the foregoing method examples, for example, may be divided in a way that each functional module or functional unit corresponds to a respective function, or that two or more functions are integrated into one processing module. The integrated module may be implemented in the form of hardware or software functional modules or functional units. It will be noted that, the division of modules or units in the embodiments of the present disclosure is schematic, and is only a division according to logical functions, and there may be other division manners in actual implementation.

Figure 13:
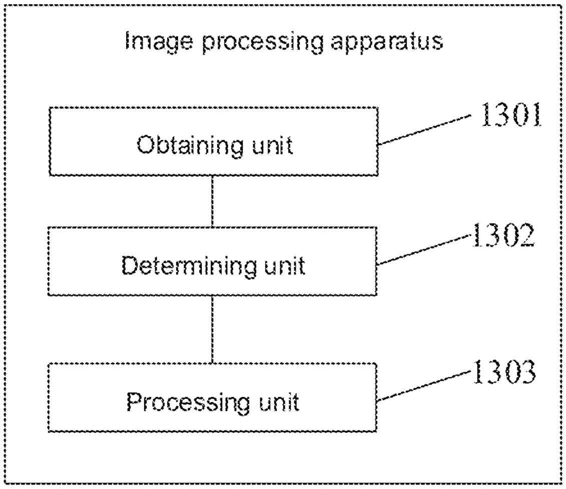
FIG. 13 is a structural diagram of an electronic device, in accordance with some embodiments.

As shown in FIG. 13, which is a schematic structural diagram of an image processing apparatus provided by embodiments of the present disclosure, the image processing apparatus is applied to an electronic device with a display screen. The apparatus includes an obtaining unit 1301, a determining unit 1302 and a processing unit 1303.

The obtaining unit 1301 is configured to obtain a plurality of frame rates in at least one first time period; in the first time period, the electronic device is configured with a first preset frame rate.

The determining unit 1302 is configured to determine a second preset frame rate of the electronic device in the second time period next to the first time period based on the plurality of frame rates in at least one first time period.

The processing unit 1303 is configured to render an image in the second time period based on the second preset frame rate, and display the rendered image through the display screen. A frame rate used by the electronic device when rendering the image in the second time period is less than or equal to the second preset frame rate.

In some embodiments, the electronic device is configured with a plurality of preset frame rates, and the determining unit 1302 is specifically configured to: determine the second preset frame rate of the electronic device in the second time period based on an average value of the frame rates in each of the at least one first time period. The plurality of preset frame rates include the first preset frame rate and the second preset frame rate.

In some embodiments, in a case where a difference between the average value of the frame rates in each of the at least one first time period and the first preset frame rate is less than a preset value, the second preset frame rate is a preset frame rate that is greater than the first preset frame rate among the plurality of preset frame rates.

In some embodiments, in a case where the difference between the average value of the frame rates in the first time period and the first preset frame rate is greater than or equal to the preset value, the second preset frame rate is a preset frame rate that is less than or equal to the average value of the frame rates in each of the at least one first time period among the plurality of preset frame rates.

In some embodiments, the processing unit 1303 is further configured to set an initial preset frame rate of the electronic device to the maximum preset frame rate among the plurality of preset frame rates in response to a power-on operation.

In some embodiments, the obtaining unit 1301 is further configured to obtain a head rotation speed of a user who uses the electronic device in the at least one first time period. The determining unit 1302 is further configured to determine a corresponding first resolution of the electronic device in the second time period and adjust the second preset frame rate based on the head rotation speed of the user. The first resolution is inversely proportional to the head rotation speed of the user. The processing unit 1303 is specifically configured to render the image in the second time period based on the adjusted second preset frame rate and the first resolution.

In some embodiments, the electronic device is configured with a plurality of preset resolutions. The determining unit 1302 is specifically configured to: determine that, in a case where the head rotation speed of the user is greater than or equal to a preset speed, the first resolution corresponding to the electronic device in the second time period is a first preset resolution of the plurality of preset resolutions; and determine that, in a case where the head rotation speed of the user is less than the preset speed, the resolution of the electronic device in the second time period is a second preset resolution among the plurality of preset resolutions. The second preset resolution is greater than the first preset resolution.

In some embodiments, the determining unit 1302 is specifically configured to: adjust, in a case where the head rotation speed of the user is greater than the preset speed, the second preset frame rate to a third preset frame rate, the third preset frame rate being greater than the second preset frame rate; and adjust, in a case where the head rotation speed of the user is less than or equal to the preset speed, the second preset frame rate to a fourth preset frame rate, the fourth preset frame rate being less than the second preset frame rate. A ratio of the second preset resolution to the first preset resolution is less than or equal to a ratio of the third preset frame rate to the fourth preset frame rate.

Figure 14:
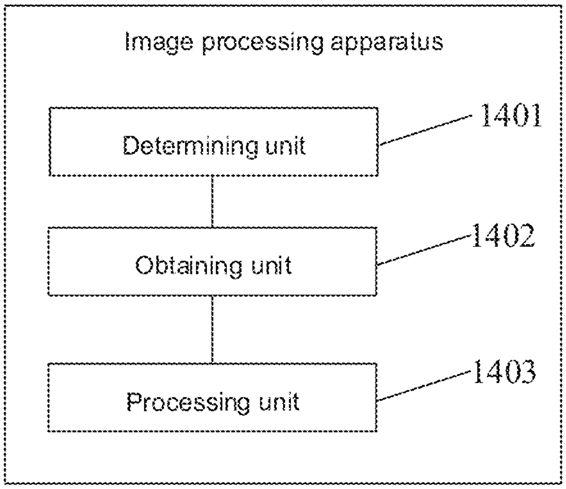
FIG. 14 is a structural diagram of an electronic device, in accordance with some embodiments.

As shown in FIG. 14, which is a schematic structural diagram of an image processing apparatus provided by the embodiments of the present disclosure, the image processing apparatus is applied to an electronic device with a display screen. The apparatus includes a determining unit 1401, an obtaining unit 1402, and a processing unit 1403.

The determining unit 1401 is configured to determine a gazing region corresponding to the user gazing at the display screen at a current time.

The obtaining unit 1402 is configured to obtain an image to be processed and an image rendering capability of GPU of the electronic device.

The determining unit 1401 is further configured to: determine data information of an image of the gazing region in the image to be processed; and determine image processing complexity of the image of the gazing region based on the data information of the image of the gazing region. The determining unit 1401 is further configured to: determine a first resolution and a first refresh rate corresponding to the image in the gazing region based on the image processing complexity of the image of the gazing region and the image rendering capability of the GPU.

The processing unit 1403 is further configured to: render the image of the gazing region based on the first resolution and the first refresh rate to obtain a rendered image to be processed; and display the rendered image to be processed through the display screen.

In some embodiments, the determining unit 1401 is further configured to determine image processing complexity of the image to be processed. The determining unit 1401 is further configured to determine a target resolution and a target refresh rate of the image to be processed based on the image processing complexity of the image to be processed and the image rendering capability of the GPU. The determining unit 1401 is specifically configured to: determine a first resolution based on the target resolution and the image processing complexity of the image of the gazing region, and use the target refresh rate as the first refresh rate.

In some embodiments, the determining unit 1401 is specifically configured to: obtain pupil coordinates of the user at the current time; and determine the gazing region corresponding to the user at the current time based on the pupil coordinates.

In some embodiments, the electronic device is provided with a sensor for detecting the head rotation speed of the user. The obtaining unit 1402 is further configured to obtain the head rotation speed of the user at the current time through the sensor. The determining unit 1401 is specifically configured to determine the first resolution and the first refresh rate based on the image processing complexity of the image of the gazing region, the image rendering capability of the GPU, and the head rotation speed of the user.

In some embodiments, the determining unit 1401 is specifically configured to: determine the image processing complexity of the image of the gazing region based on the data information of the image of the gazing region and a preset complexity database. The preset complexity database includes a corresponding relationship between the data information of the image and the image processing complexity. The data information of the image of the gazing region includes one or more of the number of sub-images and the number of layers of the image of the gazing region.

In some embodiments, product of the target resolution and the target refresh rate is a preset parameter value. The preset parameter value is related to the configuration information of the electronic device.

In some embodiments, the determining unit 1401 is further configured to determine a second resolution and a second refresh rate corresponding to an image of a non-gazing region. The non-gazing region refers to a region in the display region of the display screen except for the gazing region. The second resolution is less than the first resolution, and the second refresh rate is equal to the first refresh rate. The processing unit 1403 is further configured to render the image of the non-gazing region by using the second resolution and the second refresh rate to obtain a rendered image of the non-gazing region.

In some embodiments, the second resolution is a difference between the target resolution and the first resolution.

In some embodiments, the processing unit 1403 is further configured to stitch the rendered image of the gazing region and the rendered image of the non-gazing region to obtain a rendered image to be processed.

In some embodiments, the electronic device is provided with a first API and a second API. The first API is connected to the sensor. The second API is connected to the GPU. The obtaining unit 1402 is further configured to: obtain the head rotation rate of the user through the first API; and obtain the image processing complexity of the image to be processed through the second API.

In a case where implemented by hardware, the obtaining unit 1402 in the embodiments of the present disclosure may be integrated on the communication interface, and the determining unit 1401 and the processing unit 1403 may be integrated on the processor. The specific implementation is shown in FIG. 15.

Figure 15:
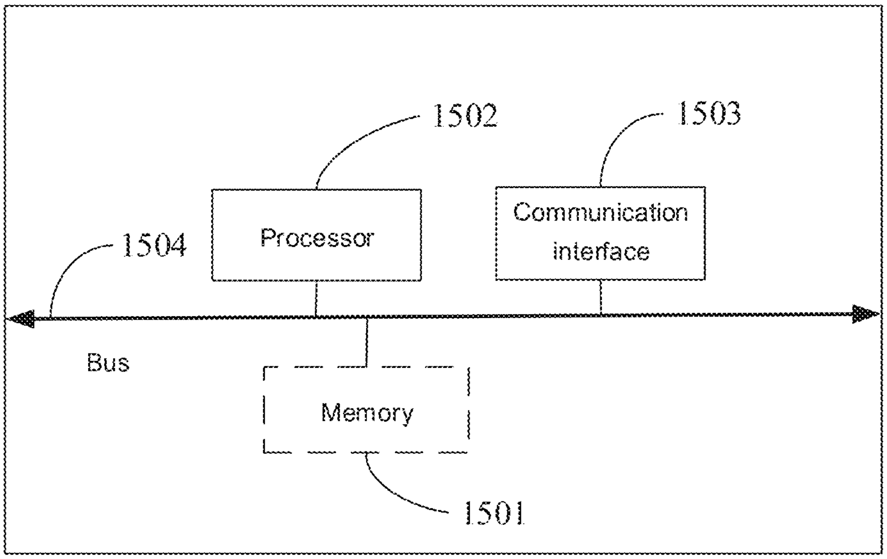
FIG. 15 is a structural diagram of an electronic device, in accordance with some embodiments.

FIG. 15 shows a possible structural schematic diagram of a communication device of the image processing apparatus involved in the above embodiments. The communication device includes a processor 1502 and a communication interface 1503. The processor 1502 is used to control and manage the actions of the device, for example, to perform steps performed by the determining unit 1401 and the processing unit 1403, and/or to perform other processes of the solution described herein. The communication interface 1503 is used to support communication between the device and other network entities, for example, perform the steps performed by the above-mentioned obtaining unit 1402. The device may further include a memory 1501 and a bus 1504. The memory 1501 is used for storing program code and data of the device.

The memory 1501 may be a memory in the device. The memory may include volatile memory, such as a random access memory; alternatively, the memory may include non-volatile memory, such as a read-only memory, flash memory, hard disk or solid state drive; alternatively, the memory may include a combination of the above types of memory.

The processor 1502 may implement or execute various illustrative logical blocks, modules and circuits described in content of the present disclosure. The processor may be a central processing unit, a general-purpose processor, a digital signal processor, an application specific integrated circuit, a field programmable gate array, or any other programmable logic device, a transistor logic device, a hardware component, or any combination thereof. It may implement or execute various illustrative logical blocks, modules and circuits described in content of the present disclosure. The processor may also be a combination that implements computing functions, for example, a combination including one or more microprocessors, a combination of a DSP and a microprocessor, or the like.

The bus 1504 may be an extended industry standard architecture (EISA) bus or the like. The bus 1504 may be divided into an address bus, a data bus, a control bus, and the like. For ease of presentation, only one thick line is used in FIG. 15, but it does not mean that there is only one bus or one type of bus.

The device in FIG. 15 may also be a chip. The chip includes one or more (including two) processors 1502 and communication interfaces 1503.

Optionally, the chip further includes a memory 1501. The memory 1501 may include a read-only memory and a random access memory, and provide operating instructions and data to the processor 1502. Part of the memory 1501 may include non-volatile random access memory (NVRAM).

In some embodiments, the memory 1501 stores the following elements, such as execution modules or data structures, or subsets thereof, or extended sets thereof.

In the embodiments of the present disclosure, the corresponding operation is performed by calling the operation instructions stored in the memory 1501 (the operation instructions may be stored in the operating system).

Some embodiments of the present disclosure provide a computer-readable storage medium (for example, a non-transitory computer-readable storage medium), the computer-readable storage medium has stored a computer program instruction, and the computer program instruction, when executed on a computer (for example, an electric device), causes the computer to perform the image processing method according to any of the above embodiments.

For example, the computer-readable storage medium may include, but is not limited to, a magnetic storage device (e.g., a hard disk, a floppy disk or a magnetic tape), an optical disk ((e.g., a compact disk (CD), a digital versatile disk (DVD)), a smart card and a flash memory device (e.g., an erasable programmable read-only memory (EPROM), a card, a stick or a key driver). Various computer-readable storage media described in the present disclosure may represent one or more devices and/or other machine-readable storage medium for storing information. The term "computer-readable storage medium" may include, but is not limited to, wireless channels and various other media capable of storing, containing and/or carrying instructions and/or data.

Some embodiments of the present disclosure provide a computer program product, which is stored on, for example, a non-transitory computer-readable storage medium. The computer program product includes a computer program instruction, and when the computer program instructions are executed on a computer (for example, an electronic device), the computer program instructions cause the computer to perform the image processing method according to the foregoing embodiments.

Some embodiments of the present disclosure provide a computer program. When the computer program is executed on a computer (for example, an electronic device), the computer program causes the computer to perform the image processing method according to the foregoing embodiments.

Beneficial effects of the computer-readable storage medium, the computer program product and the computer program are the same as the beneficial effects of the image processing method as described in the above embodiments, and details will not be repeated here.

In several embodiments provided in the present disclosure, it will be understood that the disclosed system, device and method may be implemented through other manners. For example, the embodiments of the apparatus described above are merely exemplary. For example, the division of the units is only a logical functional division. In actual implementation, there are other division manners. For example, a plurality of units or modules are combined or integrated into another system, or some features may be ignored or not executed. Furthermore, the mutual coupling or direct coupling or communication connection shown or discussed may be an indirect coupling or communication connection through some interfaces, devices or units, and may be in an electrical, mechanical or other form.

The units described as separate components may or may not be physically separated, and the component(s) shown as units may be or may not be physical unit(s), i.e., may be located in one place, or may be distributed to multiple network units. Some or all of the units may be selected according to actual needs to achieve the purposes of the solutions in the embodiments.

In addition, the functional units in the embodiments of the present disclosure may be integrated into a single processing unit or may be separate physical units, or two or more units may be integrated into a single unit.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. An image processing method, applied to an electronic device with a display screen, the method comprising:

determining a gazing region corresponding to a user gazing at the display screen at a current time;

obtaining an image to be processed;

determining data information of an image of the gazing region in the image to be processed;

determining image processing complexity of the image of the gazing region based on the data information of the image of the gazing region;

obtaining an image rendering capability of a graphics processor (GPU) of the electronic device;

determining a first resolution and a first refresh rate corresponding to the image of the gazing region based on the image processing complexity of the image of the gazing region and the image rendering capability of the GPU; and rendering the image of the gazing region based on the first resolution and the first refresh rate to obtain a rendered image to be processed to display the rendered image to be processed through the display screen; and the method further comprising:

determining image processing complexity of the image to be processed;

determining a target resolution and a target refresh rate of the image to be processed based on the image processing complexity of the image to be processed and the image rendering capability of the GPU;

determining a second resolution and a second refresh rate corresponding to an image of a non-gazing region, wherein the non-gazing region is a region in a display region of the display screen except for the gazing region; and rendering the image of the non-gazing region by using the second resolution and the second refresh rate to obtain a rendered image of the non-gazing region; wherein determining the image processing complexity of the image of the gazing region based on the data information of the image of the gazing region includes:

determining the image processing complexity of the image of the gazing region based on the data information of the image of the gazing region and a preset complexity database; wherein the preset complexity database includes a corresponding relationship between the data information and the image processing complexity of the image, and the data information of the image of the gazing region includes one or more of a number of sub-images and a number of layers of the image of the gazing region; and wherein the second resolution is a difference between the target resolution and the first resolution.

2. The method according to claim 1, wherein determining the first resolution and the first refresh rate corresponding to the image of the gazing region based on the image processing complexity of the image of the gazing region and the image rendering capability of the GPU includes:

determining the first resolution based on the target resolution and the image processing complexity of the image of the gazing region; and using the target refresh rate as the first refresh rate.

3. The method according to claim 2, wherein product of the target resolution and the target refresh rate is a preset parameter value, and the preset parameter value is related to configuration information of the electronic device.

4. The method according to claim 3, wherein the second resolution is less than the first resolution, and the second refresh rate is equal to the first refresh rate.

5. The method according to claim 4, wherein wherein the method further comprises: stitching the rendered image of the gazing region and the rendered image of the non-gazing region to obtain a rendered image to be processed.

6. The method according to claim 1, wherein determining the gazing region corresponding to the user gazing at the display screen at the current time includes:

obtaining pupil coordinates of the user at the current time; and determining the gazing region corresponding to the user at the current time based on the pupil coordinates.

7. The method according to claim 1, wherein the electronic device is provided with a sensor, the sensor is used to detect a head rotation speed of the user, the method further comprises:

obtaining the head rotation speed of the user at the current time through the sensor; wherein determining the first resolution and the first refresh rate corresponding to the image of the gazing region based on the image processing complexity of the image of the gazing region and the image rendering capability of the GPU includes:

determining the first resolution and the first refresh rate based on the image processing complexity of the image of the gazing region, the image rendering capability of the GPU and the head rotation speed of the user.

8. The method according to claim 7, wherein the electronic device is provided with a first application programming interface (API) and a second API, the first API is connected to the sensor, and the second API is connected to the GPU; the method comprises:

obtaining the head rotation rate of the user through the first API; and obtaining the image processing complexity of the image to be processed through the second API.

9. An image processing apparatus, comprising a processor and a communication interface; wherein the communication interface is coupled to the processor, and the processor is used to run computer programs or instructions to implement the image processing method according to claim 1.

10. A non-transitory computer-readable storage medium having stored thereon instructions that, when executed by a computer, cause the computer to perform the image processing method according to claim 1.

* * * * *